US012544730B2

(12) United States Patent
Elabbadi et al.

(10) Patent No.: US 12,544,730 B2
(45) Date of Patent: Feb. 10, 2026

(54) PROCESS FOR PREPARING MICROCAPSULES

(71) Applicant: FIRMENICH SA, Satigny (CH)

(72) Inventors: Amal Elabbadi, Satigny (CH); Philipp Erni, Satigny (CH); Marlene Jacquemond, Satigny (CH)

(73) Assignee: FIRMENICH SA, Satigny (CH)

( * ) Notice: Subject to any disclaimer, the term of this patent is extended or adjusted under 35 U.S.C. 154(b) by 658 days.

(21) Appl. No.: 16/981,047

(22) PCT Filed: Jun. 19, 2019

(86) PCT No.: PCT/EP2019/066213
§ 371 (c)(1),
(2) Date: Sep. 15, 2020

(87) PCT Pub. No.: WO2019/243425
PCT Pub. Date: Dec. 26, 2019

(65) Prior Publication Data
US 2021/0106964 A1 Apr. 15, 2021

(30) Foreign Application Priority Data
Jun. 21, 2018 (EP) .................................... 18179125

(51) Int. Cl.
*B01J 13/10* (2006.01)
*A23L 27/00* (2016.01)
*A23P 10/30* (2016.01)
*B01J 13/16* (2006.01)
*C11D 3/50* (2006.01)

(52) U.S. Cl.
CPC ............... *B01J 13/10* (2013.01); *A23L 27/72* (2016.08); *A23P 10/30* (2016.08); *B01J 13/16* (2013.01); *C11D 3/505* (2013.01)

(58) Field of Classification Search
CPC .. B01J 13/10; B01J 13/16; B01J 13/14; A23L 27/72; A23P 10/30; C11D 3/505
See application file for complete search history.

(56) References Cited

U.S. PATENT DOCUMENTS

| 2010/0055281 A1 | 3/2010 | Barrow et al. |
| 2011/0117180 A1* | 5/2011 | Yan .......................... A61K 8/645 426/103 |
| 2015/0250689 A1* | 9/2015 | Dardelle ................... B01J 13/14 264/4.1 |

(Continued)

FOREIGN PATENT DOCUMENTS

| CN | 101554573 A | 10/2009 |
| DE | 10209222 A1 | 9/2003 |
| JP | 2015536811 A | 12/2015 |

(Continued)

OTHER PUBLICATIONS

International Search Report and Written Opinion for corresponding PCT/EP2019/066213 mailed Aug. 14, 2019, 9 pages.

*Primary Examiner* — Jeffrey D Washville
(74) *Attorney, Agent, or Firm* — Armstrong Teasdale LLP

(57) ABSTRACT

Described herein is a new process for the preparation of core-shell microcapsules. Also described herein are microcapsules. Also described herein are consumer products including said microcapsules, in particular perfumed consumer products or flavoured consumer products.

18 Claims, 8 Drawing Sheets

(56) References Cited

U.S. PATENT DOCUMENTS

2017/0216166 A1   8/2017   Sasaki et al.

FOREIGN PATENT DOCUMENTS

| WO | 2008085997 A2 | 7/2008 |
| WO | 2009054841 A2 | 4/2009 |
| WO | 2016193435 A1 | 12/2016 |
| WO | 2019145416 A1 | 8/2019 |
| WO | 2019243427 A1 | 12/2019 |

* cited by examiner

PROCESS FOR PREPARING MICROCAPSULES

CROSS-REFERENCE TO RELATED APPLICATIONS

This application is a U.S. National Phase Application of PCT/EP2019/066213, filed Jun. 19, 2019, which claims the benefit of priority to European Patent Application No. 18179125.2. filed Jun. 21, 2018, the entire contents of which are hereby incorporated by reference herein.

TECHNICAL FIELD

The present invention relates to a new process for the preparation of core-shell microcapsules. Microcapsules are also an object of the invention. Consumer products comprising said microcapsules, in particular perfumed consumer products or flavoured consumer products are also part of the invention.

BACKGROUND OF THE INVENTION

One of the problems faced by the perfume and flavour industry lies in the relatively rapid loss of olfactive benefit provided by active compounds due to their volatility. The encapsulation of those active substances provides at the same time a protection of the ingredients there-encapsulated against "aggressions" such as oxidation or moisture and allows, on the other hand, a certain control of the kinetics of flavour or fragrance release to induce sensory effects through sequential release.

There is still a need to provide new microcapsules, while not compromising on their performance, in particular in terms of stability in a consumer product, as well as in delivering a good performance in terms of hydrophobic material delivery.

The present invention is proposing a solution to the above-mentioned problem, based on a new process for the preparation of core-shell microcapsules formed from protein/polysaccharides complexes.

SUMMARY

It has now been found that performing microcapsules encapsulating hydrophobic material, preferably active ingredients could be obtained by interacting a polysaccharide with an oil-in water emulsion stabilized with a protein, followed by the denaturation of the protein, to form the wall of the microcapsules. The process of the invention therefore provides a solution to the above-mentioned problems as it allows preparing microcapsules with the desired stability in different applications.

In a first aspect, the present invention relates to a process for preparing a core-shell microcapsules slurry, said process comprising the steps of:
  a) dispersing an oil phase comprising a hydrophobic material, preferably a flavor or a perfume, into an aqueous phase comprising a globular protein to form an oil-in-water emulsion;
  b) adding an aqueous solution comprising a polysaccharide into the oil-in-water emulsion; and
  c) applying sufficient conditions to induce the denaturation of the protein so as to form core-shell microcapsules in the form of a slurry.

In a second aspect, the invention relates to a core-shell microcapsules slurry obtainable by the process as defined above.

In a third aspect, the invention relates to a microcapsule slurry or microcapsule powder comprising at least one microcapsule made of:
  an oil-based core comprising a hydrophobic material, and
  at least one shell comprising a protein and a polysaccharide.

In a fourth and fifth aspects, the invention relates to perfumed consumer products and flavoured edible products comprising the microcapsules defined above.

DETAILED DESCRIPTION OF THE INVENTION

Figure 1:
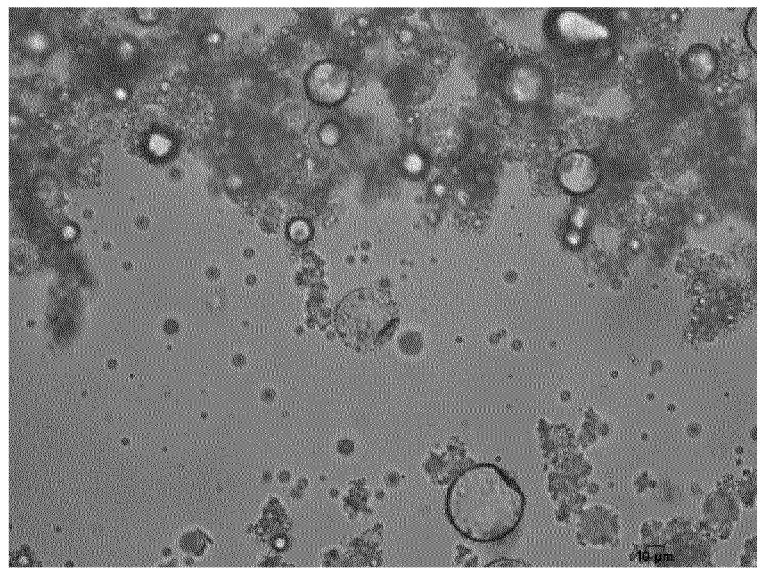
FIG. 1 is an optical microscope picture of a microcapsule of the invention (WPI/HMP=8 (w/w)).

Unless stated otherwise, percentages (%) are meant to designate a percentage by weight of a composition.

By "active ingredient", it is meant a single compound or a combination of ingredients.

By "perfume or flavour oil", it is meant a single perfuming or flavouring compound or a mixture of several perfuming or flavouring compounds.

By "consumer product" or "end-product" it is meant a manufactured product ready to be distributed, sold and used by a consumer.

For the sake of clarity, by the expression "dispersion" in the present invention it is meant a system in which particles are dispersed in a continuous phase of a different composition and it specifically includes a suspension or an emulsion.

A "core-shell microcapsule", or the similar, in the present invention it is meant that capsules have a particle size distribution in the micron range (e.g. a mean diameter (d(v, 0.5)) comprised between about 1 and 3000 microns) and comprise an external solid oligomers-based shell or shell and an internal continuous oil phase enclosed by the external shell. According to the invention, the wordings "mean diameter" or "mean size" are used indifferently.

Microcapsules of the present invention have a mean size preferably greater than 10 microns, more preferably greater than 15 microns, even more preferably greater than 20 microns.

According to an embodiment, microcapsules have a mean size comprised between 10 and 500 microns, preferably between 10 and 100 microns.

According to an embodiment, microcapsules have a mean size comprised between 15 and 500 microns, preferably between 15 and 100 microns.

According to an embodiment, microcapsules have a mean size comprised between 20 and 500 microns, preferably between 20 and 100 microns.

Microcapsules according to the invention are preferably not agglomerated.

The present invention provides an advantageous alternative to known microcapsules with a process involving the denaturation of a protein and therefore the formation of the microcapsules wall.

Process for Preparing a Core-Shell Microcapsule Slurry

The present invention therefore relates in a first aspect to a process for preparing a core-shell microcapsules slurry, said process comprising the steps of:
  a) dispersing an oil phase comprising a hydrophobic material, preferably a flavor or a perfume, into an aqueous phase comprising a globular protein to form an oil-in-water emulsion;
  b) adding an aqueous solution comprising a polysaccharide into the oil-in-water emulsion; and
  c) applying sufficient conditions to induce the denaturation of the protein so as to form core-shell microcapsule in the form of a slurry.

Step a) Dispersing an Oil Phase Comprising a Hydrophobic Material, Preferably a Flavor or a Perfume, into an Aqueous Phase Comprising a Protein to Form an Oil-in-Water Emulsion In step a) of the process, an oil-in-water emulsion is prepared. The oil phase comprises a hydrophobic material. Hydrophobic material according to the invention can be "inert" material like solvents or active ingredients.

According to a preferred embodiment, the hydrophobic material is a hydrophobic active ingredient and comprises preferably a perfume or flavour. Alternative hydrophobic ingredients which could benefit from being encapsulated could be used either instead of a perfume or flavour, or in combination with a perfume or flavour. Non-limiting examples of such ingredients include a cosmetic, skin caring, malodour counteracting, bactericide, fungicide, pharmaceutical or agrochemical ingredient, a sanitizing agent, an insect repellent or attractant.

The nature and type of the insect control agents that can be present in the hydrophobic internal phase do not warrant a more detailed description here, which in any case would not be exhaustive, the skilled person being able to select them on the basis of its general knowledge and according to the intended use or application.

Examples of such insect control agents are birch, DEET (N,N-diethyl-m-toluamide), essential oil of the lemon *eucalyptus* (*Corymbia citriodora*) and its active compound p-menthane-3,8-diol(PMD), icaridin (hydroxyethyl isobutyl piperidine carboxylate), Nepelactone, Citronella oil, Neem oil, Bog Myrtle (Myrica Gale), Dimethyl carbate, Tricyclodecenyl allyl ether, IR3535 (3-[N-Butyl-N-acetyl]-aminopropionic acid, ethyl ester, Ethylhexanediol, Dimethyl phthalate, Metofluthrin, Indalone, SS220, anthranilate-based insect repellents, and mixtures thereof.

By "perfume oil" (or also "perfume") or "flavour" what is meant here is an ingredient or composition that is a liquid at about 20° C. Said perfume or flavour oil can be a perfuming or flavouring ingredient alone or a mixture of ingredients in the form of a perfuming or flavouring composition. As a "perfuming ingredient" it is meant here a compound, which is used in perfuming preparations or compositions to impart as primary purpose a hedonic effect. In other words such an ingredient, to be considered as being a perfuming one, must be recognized by a person skilled in the art as being able to at least impart or modify in a positive or pleasant way the odor of a composition, and not just as having an odor. The nature and type of the perfuming ingredients present in the oil phase do not warrant a more detailed description here, which in any case would not be exhaustive, the skilled person being able to select them on the basis of its general knowledge and according to intended use or application and the desired organoleptic effect. In general terms, these perfuming ingredients belong to chemical classes as varied as alcohols, aldehydes, ketones, esters, ethers, acetates, nitriles, terpenoids, nitrogenous or sulphurous heterocyclic compounds and essential oils, and said perfuming co-ingredients can be of natural or synthetic origin. Many of these co-ingredients are listed in reference texts such as the book by S. Arctander, Perfume and Flavor Chemicals, 1969, Montclair, New Jersey, USA, or its more recent versions, or in other works of a similar nature, as well as in the abundant patent literature in the field of perfumery. It is also understood that said ingredients may also be compounds known to release in a controlled manner various types of perfuming compounds.

The perfuming ingredients may be dissolved in a solvent of current use in the perfume industry. The solvent is preferably not an alcohol. Examples of such solvents are diethyl phthalate, isopropyl myristate, Abalyn® (rosin resins, available from Eastman), benzyl benzoate, ethyl citrate, limonene or other terpenes, or isoparaffins. Preferably, the solvent is very hydrophobic and highly sterically hindered, like for example Abalyn® or benzyl benzoate.

Preferably the perfume comprises less than 30% of solvent. More preferably the perfume comprises less than 20% and even more preferably less than 10% of solvent, all these percentages being defined by weight relative to the total weight of the perfume. Most preferably, the perfume is essentially free of solvent.

Preferred perfuming ingredients are those having a high steric hindrance and in particular those from one of the following groups:
  Group 1: perfuming ingredients comprising a cyclohexane, cyclohexene, cyclohexanone or cyclohexenone ring substituted with at least one linear or branched $C_1$ to $C_4$ alkyl or alkenyl substituent;
  Group 2: perfuming ingredients comprising a cyclopentane, cyclopentene, cyclopentanone or cyclopentenone ring substituted with at least one linear or branched $C_4$ to $C_8$ alkyl or alkenyl substituent;

Group 3: perfuming ingredients comprising a phenyl ring or perfuming ingredients comprising a cyclohexane, cyclohexene, cyclohexanone or cyclohexenone ring substituted with at least one linear or branched $C_5$ to $C_8$ alkyl or alkenyl substituent or with at least one phenyl substituent and optionally one or more linear or branched $C_1$ to $C_3$ alkyl or alkenyl substituents;

Group 4: perfuming ingredients comprising at least two fused or linked $C_5$ and/or $C_6$ rings;

Group 5: perfuming ingredients comprising a camphor-like ring structure;

Group 6: perfuming ingredients comprising at least one C7 to C20 ring structure;

Group 7: perfuming ingredients having a log P value above 3.5 and comprising at least one tert-butyl or at least one trichloromethyl substitutent;

Examples of ingredients from each of these groups are:

Group 1: 2,4-dimethyl-3-cyclohexene-1-carbaldehyde (origin: Firmenich SA, Geneva, Switzerland), isocyclocitral, menthone, isomenthone, Romascone® (methyl 2,2-dimethyl-6-methylene-1-cyclohexanecarboxylate, origin: Firmenich SA, Geneva, Switzerland), nerone, terpineol, dihydroterpineol, terpenyl acetate, dihydroterpenyl acetate, dipentene, eucalyptol, hexylate, rose oxide, Perycorolle® ((S)-1,8-p-menthadiene-7-ol, origin: Firmenich SA, Geneva, Switzerland), 1-p-menthene-4-ol, (1RS,3RS,4SR)-3-p-mentanyl acetate, (1R,2S,4R)-4,6,6-trimethyl-bicyclo[3,1,1]heptan-2-ol, Doremox® (tetrahydro-4-methyl-2-phenyl-2H-pyran, origin: Firmenich SA, Geneva, Switzerland), cyclohexyl acetate, cyclanol acetate, Fructalate® (1,4-cyclohexane diethyldicarboxylate, origin: Firmenich SA, Geneva, Switzerland), Koumalactone ((3ARS,6SR, 7ASR)-perhydro-3,6-dimethyl-benzo[B]furan-2-one, origin: Firmenich SA, Geneva, Switzerland), Natactone® ((6R)-perhydro-3,6-dimethyl-benzo[B]furan-2-one, origin: Firmenich SA, Geneva, Switzerland), 2,4, 6-trimethyl-4-phenyl-1,3-dioxane, 2,4,6-trimethyl-3-cyclohexene-1-carbaldehyde;

Group 2: (E)-3-methyl-5-(2,2,3-trimethyl-3-cyclopenten-1-yl)-4-penten-2-ol (origin: Givaudan SA, Vernier, Switzerland), (1'R,E)-2-ethyl-4-(2',2',3'-trimethyl-3'-cyclopenten-1'-yl)-2-buten-1-ol (origin: Firmenich SA, Geneva, Switzerland), Polysantol® ((1'R,E)-3,3-dimethyl-5-(2',2',3'-trimethyl-3'-cyclopenten-1'-yl)-4-penten-2-ol, origin: Firmenich SA, Geneva, Switzerland), fleuramone, Hedione® HC (methyl-cis-3-oxo-2-pentyl-1-cycloacetate, origin: Firmenich SA, Geneva, Switzerland), Veloutone® (2,2,5-Trimethyl-5-pentyl-1-cyclopentanone, origin: Firmenich SA, Geneva, Switzerland), Nirvanol® (3,3-dimethyl-5-(2,2,3-trimethyl-3-cyclopenten-1-yl)-4-penten-2-ol, origin: Firmenich SA, Geneva, Switzerland), 3-methyl-5-(2,2,3-trimethyl-3-cyclopenten-1-yl)-2-pentanol (origin, Givaudan SA, Vernier, Switzerland);

Group 3: damascones, Neobutenone® (1-(5,5-dimethyl-1-cyclohexen-1-yl)-4-penten-1-one, origin: Firmenich SA, Geneva, Switzerland), nectalactone ((1'R)-2-[2-(4'-methyl-3'-cyclohexen-1'-yl)propyl]cyclopentanone), alpha-ionone, beta-ionone, damascenone, Dynascone® (mixture of 1-(5,5-dimethyl-1-cyclohexen-1-yl)-4-penten-1-one and 1-(3,3-dimethyl-1-cyclohexen-1-yl)-4-penten-1-one, origin: Firmenich SA, Geneva, Switzerland), Dorinone® beta (1-(2,6,6-trimethyl-1-cyclohexen-1-yl)-2-buten-1-one, origin: Firmenich SA, Geneva, Switzerland), Romandolide® ((1S,1'R)-[1-(3',3'-Dimethyl-1'-cyclohexyl)ethoxycarbonyl]methyl propanoate, origin: Firmenich SA, Geneva, Switzerland), 2-tert-butyl-1-cyclohexyl acetate (origin: International Flavors and Fragrances, USA), Limbanol® (1-(2,2,3,6-tetramethyl-cyclohexyl)-3-hexanol, origin: Firmenich SA, Geneva, Switzerland), trans-1-(2,2,6-trimethyl-1-cyclohexyl)-3-hexanol (origin: Firmenich SA, Geneva, Switzerland), (E)-3-methyl-4-(2,6,6-trimethyl-2-cyclohexen-1-yl)-3-buten-2-one, terpenyl isobutyrate, Lorysia® (4-(1,1-dimethylethyl)-1-cyclohexyl acetate, origin: Firmenich SA, Geneva, Switzerland), 8-methoxy-1-p-menthene, Helvetolide® ((1S,1'R)-2-[1-(3',3'-dimethyl-1'-cyclohexyl) ethoxy]-2-methylpropyl propanoate, origin: Firmenich SA, Geneva, Switzerland), para tert-butylcyclohexanone, menthenethiol, 1-methyl-4-(4-methyl-3-pentenyl)-3-cyclohexene-1-carbaldehyde, allyl cyclohexylpropionate, cyclohexyl salicylate, 2-methoxy-4-methylphenyl methyl carbonate, ethyl 2-methoxy-4-methylphenyl carbonate, 4-ethyl-2-methoxyphenyl methyl carbonate;

Group 4: Methyl cedryl ketone (origin: International Flavors and Fragrances, USA), Verdylate, vetyverol, vetyverone, 1-(octahydro-2,3,8,8-tetramethyl-2-naphtalenyl)-1-ethanone (origin: International Flavors and Fragrances, USA), (5RS,9RS,10SR)-2,6,9,10-tetramethyl-1-oxaspiro[4.5]deca-3,6-diene and the (5RS,9SR, 10RS) isomer, 6-ethyl-2,10,10-trimethyl-1-oxaspiro [4.5]deca-3,6-diene, 1,2,3,5,6,7-hexahydro-1,1,2,3,3-pentamethyl-4-indenone (origin: International Flavors and Fragrances, USA), Hivernal® (a mixture of 3-(3, 3-dimethyl-5-indanyl)propanal and 3-(1,1-dimethyl-5-indanyl)propanal, origin: Firmenich SA, Geneva, Switzerland), Rhubofix® (3',4-dimethyl-tricyclo[6.2.1.0(2, 7)]undec-4-ene-9-spiro-2'-oxirane, origin: Firmenich SA, Geneva, Switzerland), 9/10-ethyldiene-3-oxatricyclo[6.2.1.0(2,7)]undecane, Polywood® (perhydro-5,5, 8-yl-trimethyl-2-naphthalenyl acetate, origin: Firmenich SA, Geneva, Switzerland), octalynol, Cetalox® (dodecahydro-3a,6,6,9a-tetramethyl-naphtho[2,1-b] furan, origin: Firmenich SA, Geneva, Switzerland), tricyclo[5.2.1.0(2,6)]dec-3-en-8-yl acetate and tricyclo [5.2.1.0(2,6)]dec-4-en-8-yl acetate as well as tricyclo [5.2.1.0(2,6)]dec-3-en-8-yl propanoate and tricyclo [5.2.1.0(2,6)]dec-4-en-8-yl propanoate, (+)-(1S,2S, 3S)-2,6,6-trimethyl-bicyclo[3.1.1]heptane-3-spiro-2'-cyclohexen-4'-one;

Group 5: camphor, borneol, isobornyl acetate, 8-isopropyl-6-methyl-bicyclo[2.2.2]oct-5-ene-2-carbaldehyde, camphopinene, cedramber (8-methoxy-2,6,6,8-tetramethyl-tricyclo[5.3.1.0(1,5)]undecane, origin: Firmenich SA, Geneva, Switzerland), cedrene, cedrenol, cedrol, Florex® (mixture of 9-ethylidene-3-oxatricyclo[6.2.1.0 (2,7)]undecan-4-one and 10-ethylidene-3-oxatricyclo [6.2.1.0(2,7)]undecan-4-one, origin: Firmenich SA, Geneva, Switzerland), 3-methoxy-7,7-dimethyl-10-methylene-bicyclo[4.3.1]decane (origin: Firmenich SA, Geneva, Switzerland);

Group 6: Cedroxyde® (trimethyl-13-oxabicyclo-[10.1.0]-trideca-4,8-diene, origin: Firmenich SA, Geneva, Switzerland), Ambrettolide LG ((E)-9-hexadecen-16-olide, origin: Firmenich SA, Geneva, Switzerland), Habanolide® (pentadecenolide, origin: Firmenich SA, Geneva, Switzerland), muscenone (3-methyl-(4/5)-cyclopentadecenone, origin: Firmenich SA, Geneva, Switzerland), muscone (origin: Firmenich SA, Geneva, Switzerland), Exaltolide® (pentadecanolide, origin: Firmenich SA, Geneva, Switzerland), Exaltone® (cyclopentadecanone, origin: Firmenich SA, Geneva, Switzerland), (1-ethoxyethoxy)cyclododecane (origin: Firmenich SA, Geneva, Switzerland), Astrotone, 4,8-cyclodo-decadien-1-one;

Group 7: Lilial® (origin: Givaudan SA, Vernier, Switzerland), rosinol.

Preferably, the perfume comprises at least 30%, preferably at least 50%, more preferably at least 60% of ingredients selected from Groups 1 to 7, as defined above. More preferably said perfume comprises at least 30%, preferably at least 50% of ingredients from Groups 3 to 7, as defined above. Most preferably said perfume comprises at least 30%, preferably at least 50% of ingredients from Groups 3, 4, 6 or 7, as defined above.

According to another preferred embodiment, the perfume comprises at least 30%, preferably at least 50%, more preferably at least 60% of ingredients having a log P above 3, preferably above 3.5 and even more preferably above 3.75.

Preferably, the perfume used in the invention contains less than 10% of its own weight of primary alcohols, less than 15% of its own weight of secondary alcohols and less than 20% of its own weight of tertiary alcohols. Advantageously, the perfume used in the invention does not contain any primary alcohols and contains less than 15% of secondary and tertiary alcohols. According to an embodiment, the oil phase (or the oil-based core) comprises:

25-100 wt % of a perfume oil comprising at least 15 wt % of high impact perfume raw materials having a Log T<-4, and 0-75 wt % of a density balancing material having a density greater than 1.07 $g/cm^3$.

"High impact perfume raw materials" should be understood as perfume raw materials having a Log T<-4. The odor threshold concentration of a chemical compound is determined in part by its shape, polarity, partial charges and molecular mass. For convenience, the threshold concentration is presented as the common logarithm of the threshold concentration, i.e., Log [Threshold] ("Log T").

A "density balancing material" should be understood as a material having a density greater than 1.07 $g/cm^3$ and having preferably low or no odor.

The odor threshold concentration of a perfuming compound is determined by using a gas chromatograph ("GC"). Specifically, the gas chromatograph is calibrated to determine the exact volume of the perfume oil ingredient injected by the syringe, the precise split ratio, and the hydrocarbon response using a hydrocarbon standard of known concentration and chain-length distribution. The air flow rate is accurately measured and, assuming the duration of a human inhalation to last 12 seconds, the sampled volume is calculated. Since the precise concentration at the detector at any point in time is known, the mass per volume inhaled is known and hence the concentration of the perfuming compound. To determine the threshold concentration, solutions are delivered to the sniff port at the back-calculated concentration. A panelist sniffs the GC effluent and identifies the retention time when odor is noticed. The average across all panelists determines the odor threshold concentration of the perfuming compound. The determination of odor threshold is described in more detail in C. Vuilleumier et al., Multi-dimensional Visualization of Physical and Perceptual Data Leading to a Creative Approach in Fragrance Development, Perfume & Flavorist, Vol. 33, September, 2008, pages 54-61. The nature of high impact perfume raw materials having a Log T<-4 and density balancing material having a density greater than 1.07 $g/cm^3$ are described in WO2018115250, the content of which are included by reference.

According to an embodiment, the high impact perfume raw materials having a Log T<-4 are selected from the list in Table A below.

TABLE A high impact perfume raw materials having a Log T < −4
Perfume raw materials (Log T < −4)

(+−)-1-METHOXY-3-HEXANETHIOL
4-(4-HYDROXY-1-PHENYL)-2-BUTANONE
(+−)-2-(4-METHYL-3-CYCLOHEXEN-1-YL)-2-PROPANETHIOL
2-METHOXY-4-(1-PROPENYL)-1-PHENYL ACETATE
PYRAZOBUTYLE
3-PROPYLPHENOL
1-(3-METHYL-1-BENZOFURAN-2-YL)ETHANONE
2-(3-PHENYLPROPYL)PYRIDINE
1-(3,3-DIMETHYL-1-CYCLOHEXEN-1-YL)-4-PENTEN-1-ONE (A) +
1-(5,5-DIMETHYL-1-CYCLOHEXEN-1-YL)-4-PENTEN-1-ONE
(B)
1-(5,5-DIMETHYL-1-CYCLOHEXEN-1-YL)-4-PENTEN-1-ONE
(3RS,3ARS,6SR,7ASR)-PERHYDRO-3,6-DIMETHYL-
BENZO[[B]FURAN-2-ONE (A) + (3SR,3ARS,6SR,7ASR)-
PERHYDRO-3,6-DIMETHYL-BENZO[B]FURAN-2-ONE (B)
(+−)-1-(5-ETHYL-5-METHYL-1-CYCLOHEXEN-1-YL)-4-PENTEN-
1-ONE
(1'S,3'R)-1-METHYL-2-[(1',2',2'-TRIMETHYLBICYCLO[3.1.0]HEX-
3'-YL)METHYL]CYCLOPROPYL}METHANOL
(+−)-3-MERCAPTOHEXYL ACETATE
(2E)-1-(2,6,6-TRIMETHYL-1,3-CYCLOHEXADIEN-1-YL)-2-
BUTEN-1-ONE
7-METHYL-2H-1,5-BENZODIOXEPIN-3(4H)-ONE
(2E,6Z)-2,6-NONADIEN-1-OL
(4Z)-4-DODECENAL
(+−)-4-HYDROXY-2,5-DIMETHYL-3(2H)-FURANONE
METHYL 2,4-DIHYDROXY-3,6-DIMETHYLBENZOATE
3-METHYLINDOLE
(+−)-PERHYDRO-4ALPHA,8ABETA-DIMETHYL-4A-
NAPHTHALENOL
PATCHOULOL

TABLE A-continued high impact perfume raw materials having a Log T < −4
Perfume raw materials (Log T < −4)

2-METHOXY-4-(1-PROPENYL)PHENOL
(+−)-5,6-DIHYDRO-4-METHYL-2-PHENYL-2H-PYRAN (A) +
TETRAHYDRO-4-METHYLENE-2-PHENYL-2H-PYRAN (B)
4-METHYLENE-2-PHENYLTETRAHYDRO-2H-PYRAN (A) + (+−)-
4-METHYL-2-PHENYL-3,6-DIHYDRO-2H-PYRAN (B)
4-HYDROXY-3-METHOXYBENZALDEHYDE
NONYLENIC ALDEHYDE
2-METHOXY-4-PROPYLPHENOL
(2Z)-3-METHYL-5-PHENYL-2-PENTENENITRILE (A) + (2E)-3-
METHYL-5-PHENYL-2-PENTENENITRILE (B)
1-(SPIRO[4.5]DEC-6-EN-7-YL)-4-PENTEN-1-ONE (A) + 1-
(SPIRO[4.5]DEC-7-EN-7-YL)-4-PENTEN-1-ONE (B)
2-METHOXYNAPHTHALENE
(−)-(3AR,5AS,9AS,9BR)-3A,6,6,9A-
TETRAMETHYLDODECAHYDRONAPHTHO[2,1-B]FURAN
5-NONANOLIDE
(3AR,5AS,9AS,9BR)-3A,6,6,9A-
TETRAMETHYLDODECAHYDRONAPHTHO[2,1-B]FURAN
7-ISOPROPYL-2H,4H-1,5-BENZODIOXEPIN-3-ONE
COUMARIN
4-METHYLPHENYL ISOBUTYRATE
(2E)-1-(2,6,6-TRIMETHYL-1,3-CYCLOHEXADIEN-1-YL)-2-BUTEN-1-ONE
BETA,2,2,3-TETRAMETHYL-DELTA-METHYLENE-3-
CYCLOPENTENE-1-BUTANOL
DELTA DAMASCONE ((2E)-1-[(1RS,2SR)-2,6,6-TRIMETHYL-3-
CYCLOHEXEN-1-YL]-2-BUTEN-1-ONE)
(+−)-3,6-DIHYDRO-4,6-DIMETHYL-2-PHENYL-2H-PYRAN
ANISALDEHYDE
PARACRESOL
3-ETHOXY-4-HYDROXYBENZALDEHYDE
METHYL 2-AMINOBENZOATE
ETHYL METHYLPHENYLGLYCIDATE
OCTALACTONE G
ETHYL 3-PHENYL-2-PROPENOATE
(−)-(2E)-2-ETHYL-4-[(1R)-2,2,3-TRIMETHYL-3-CYCLOPENTEN-1-
YL]-2-BUTEN-1-OL
PARACRESYL ACETATE
DODECALACTONE
TRICYCLONE
(+)-(3R,5Z)-3-METHYL-5-CYCLOPENTADECEN-1-ONE
UNDECALACTONE
(1R,4R)-8-MERCAPTO-3-P-MENTHANONE
(3S,3AS,6R,7AR)-3,6-DIMETHYLHEXAHYDRO-1-BENZOFURAN-
2(3H)-ONE
BETA IONONE
(+−)-6-PENTYLTETRAHYDRO-2H-PYRAN-2-ONE
(3E,5Z)-1,3,5-UNDECATRIENE
10-UNDECENAL (A) + (9E)-9-UNDECENAL (B) + (9Z)-9-
UNDECENAL (C)
(Z)-4-DECENAL
(+−)-ETHYL 2-METHYLPENTANOATE
1,2-DIALLYLDISULFANE
(2Z)-2-TRIDECENENITRILE (A) + (3Z)-3-TRIDECENENITRILE (B) +
(3E)-3-TRIDECENENITRILE (C) + (2E)-2-TRIDECENENITRILE
(D)
(+−)-2-ETHYL-4,4-DIMETHYL-1,3-OXATHIANE
(+)-(3R,5Z)-3-METHYL-5-CYCLOPENTADECEN-1-ONE
3-(4-TERT-BUTYLPHENYL)PROPANAL
ALLYL (CYCLOHEXYLOXY)ACETATE
METHYLNAPHTHYLKETONE
(+−)-(4E)-3-METHYL-4-CYCLOPENTADECEN-1-ONE (A) + (+−)-
(5E)-3-METHYL-5-CYCLOPENTADECEN-1-ONE (B) + (+−)-(5Z)-3-
METHYL-5-CYCLOPENTADECEN-1-ONE (C)
CYCLOPROPYLMETHYL (3Z)-3-HEXENOATE (A) +
CYCLOPROPYLMETHYL (3E)-3-HEXENOATE (B)
(4E)-4-METHYL-5-(4-METHYLPHENYL)-4-PENTENAL
(+−)-1-(5-PROPYL-1,3-BENZODIOXOL-2-YL)ETHANONE
4-METHYL-2-PENTYLPYRIDINE
(+−)-(E)-3-METHYL-4-(2,6,6-TRIMETHYL-2-CYCLOHEXEN-1-
YL)-3-BUTEN-2-ONE
(3ARS,5ASR,9ASR,9BRS)-3A,6,6,9A-
TETRAMETHYLDODECAHYDRONAPHTHO[2,1-B]FURAN
(2S,5R)-5-METHYL-2-(2-PROPANYL)CYCLOHEXANONE OXIME
6-HEXYLTETRAHYDRO-2H-PYRAN-2-ONE
(+−)-3-(3-ISOPROPYL-1-PHENYL)BUTANAL
METHYL 2-((1RS,2RS)-3-OXO-2-
PENTYLCYCLOPENTYL)ACETATE (A) + METHYL 2-((1RS,2SR)-

TABLE A-continued high impact perfume raw materials having a Log T < −4
Perfume raw materials (Log T < −4)

3-OXO-2-PENTYLCYCLOPENTYL)ACETATE (B)
1-(2,6,6-TRIMETHYL-1-CYCLOHEX-2-ENYL)PENT-1-EN-3-ONE
INDOL
7-PROPYL-2H,4H-1,5-BENZODIOXEPIN-3-ONE
ETHYL PRALINE
(4-METHYLPHENOXY)ACETALDEHYDE
ETHYL TRICYCLO[5.2.1.0.(2,6)]DECANE-2-CARBOXYLATE
(+)-(1'S,2S,E)-3,3-DIMETHYL-5-(2',2',3'-TRIMETHYL-3'-
CYCLOPENTEN-1'-YL)-4-PENTEN-2-OL
(2R,4E)-3,3-DIMETHYL-5-[(1R)-2,2,3-TRIMETHYL-3-
CYCLOPENTEN-1-YL]-4-PENTEN-2-OL (A) + (2S,4E)-3,3-
DIMETHYL-5-[(1R)-2,2,3-TRIMETHYL-3-CYCLOPENTEN-1-YL]-
4-PENTEN-2-OL (B)
8-ISOPROPYL-6-METHYL-BICYCLO[2.2.2]OCT-5-ENE-2-
CARBALDEHYDE
METHYLNONYLACETALDEHYDE
4-FORMYL-2-METHOXYPHENYL 2-METHYLPROPANOATE
(E)-4-DECENAL
(+−)-2-ETHYL-4-(2,2,3-TRIMETHYL-3-CYCLOPENTEN-1-YL)-2-
BUTEN-1-OL
(1R,5R)-4,7,7-TRIMETHYL-6-THIABICYCLO[3.2.1]OCT-3-ENE (A) +
(1R,4R,5R)-4,7,7-TRIMETHYL-6-THIABICYCLO[3.2.1]OCTANE
(B)
(−)-(3R)-3,7-DIMETHYL-1,6-OCTADIEN-3-OL
(E)-3-PHENYL-2-PROPENENITRILE
4-METHOXYBENZYL ACETATE
(E)-3-METHYL-5-(2,2,3-TRIMETHYL-3-CYCLOPENTEN-1-YL)-4-
PENTEN-2-OL
ALLYL (3-METHYLBUTOXY)ACETATE (A) + (+−)-ALLYL (2-
METHYLBUTOXY)ACETATE
(+−)-(2E)-1-(2,6,6-TRIMETHYL-2-CYCLOHEXEN-1-YL)-2-BUTEN-
1-ONE
(1E)-1-(2,6,6-TRIMETHYL-1-CYCLOHEXEN-1-YL)-1-PENTEN-3-
ONE

According to an embodiment, perfume raw materials having a Log T<−4 are chosen in the group consisting of aldehydes, ketones, alcohols, phenols, esters lactones, ethers, epoxydes, nitriles and mixtures thereof.

According to an embodiment, perfume raw materials having a Log T<−4 comprise at least one compound chosen in the group consisting of alcohols, phenols, esters lactones, ethers, epoxydes, nitriles and mixtures thereof, preferably in amount comprised between 20 and 70% by weight based on the total weight of the perfume raw materials having a Log T<−4.

According to an embodiment, perfume raw materials having a Log T<−4 comprise between 20 and 70% by weight of aldehydes, ketones, and mixtures thereof based on the total weight of the perfume raw materials having a Log T<−4.

The remaining perfume raw materials contained in the oil phase (or the oil-based core) may have therefore a Log T>−4.

Non limiting examples of perfume raw materials having a Log T>−4 are listed in table B below.

TABLE B perfume raw materials having a Log T > −4
Perfume raw materials (Log T > −4)

ETHYL 2-METHYLBUTYRATE
(E)-3-PHENYL-2-PROPENYL
ACETATE
(+−)-8-SEC-BUTYLQUINOLINE (A) +
(+−)-6-SEC-BUTYLQUINOLINE
(+−)-3-(1,3-BENZODIOXOL-5-YL)-2-
METHYLPROPANAL
VERDYLE PROPIONATE

TABLE B-continued perfume raw materials having a Log T > −4
Perfume raw materials (Log T > −4)

1-(OCTAHYDRO-2,3,8,8-
TETRAMETHYL-2-NAPHTALENYL)-
1-ETHANONE
METHYL 2-((1RS,2RS)-3-OXO-2-
PENTYLCYCLOPENTYL)ACETATE
(+−)-(E)-4-METHYL-3-DECEN-5-OL
2,4-DIMETHYL-3-CYCLOHEXENE-1-
CARBALDEHYDE
1,3,3-TRIMETHYL-2-
OXABICYCLO[2.2.2]OCTANE
TETRAHYDRO-4-METHYL-2-(2-
METHYL-1-PROPENYL)-2H-PYRAN
ALDEHYDE C 12
1-OXA-12-CYCLOHEXADECEN-2-
ONE (A) + 1-OXA-13-
CYCLOHEXADECEN-2-ONE (B)
(+−)-3-(4-ISOPROPYLPHENYL)-2-
METHYLPROPANAL
ALDEHYDE C 11 LENIQUE
(+−)-2,6-DIMETHYL-7-OCTEN-2-OL
(+−)-2,6-DIMETHYL-7-OCTEN-2-OL
ALLYL 3-
CYCLOHEXYLPROPANOATE
(Z)-3-HEXENYL ACETATE
(2RS,5SR)-5-METHYL-2-(2-
PROPANYL)CYCLOHEXANONE (A) +
(2RS,5RS)-5-METHYL-2-(2-
PROPANYL)CYCLOHEXANONE (B)
ALLYL HEPTANOATE
(1RS,2RS)-2-(2-METHYL-2-
PROPANYL)CYCLOHEXYL ACETATE
(A) + (1RS,2SR)-2-(2-METHYL-2-
PROPANYL)CYCLOHEXYL ACETATE
(B)

TABLE B-continued perfume raw materials having a Log T > −4
Perfume raw materials (Log T > −4)

1,1-DIMETHYL-2-PHENYLETHYL BUTYRATE
GERANYL ACETATE (A) + NERYL ACETATE (B)
(+−)-1-PHENYLETHYL ACETATE
1,1-DIMETHYL-2-PHENYLETHYL ACETATE
3-METHYL-2-BUTENYL ACETATE
ETHYL 3-OXOBUTANOATE (A) <=> (2Z)-ETHYL 3-HYDROXY-2-BUTENOATE (B)
8-P-MENTHANOL
8-P-MENTHANYL ACETATE (A) + 1-P-MENTHANYL ACETATE (B)
(+−)-2-(4-METHYL-3-CYCLOHEXEN-1-YL)-2-PROPANYL ACETATE
(+−)-2-METHYLBUTYL BUTANOATE
2-{(1S)-1-[(1R)-3,3-DIMETHYLCYCLOHEXYL]ETHOXY}-2-OXOETHYL PROPIONATE
3,5,6-TRIMETHYL-3-CYCLOHEXENE-1-CARBALDEHYDE (A) + 2,4,6-TRIMETHYL-3-CYCLOHEXENE-1-CARBALDEHYDE (B)
2-CYCLOHEXYLETHYL ACETATE
ALDEHYDE C 8
ETHYL BUTANOATE
(+−)-(3E)-4-(2,6,6-TRIMETHYL-2-CYCLOHEXEN-1-YL)-3-BUTEN-2-ONE (A) + (3E)-4-(2,6,6-TRIMETHYL-1-CYCLOHEXEN-1-YL)-3-BUTEN-2-ONE (B);
1-[(1RS,6SR)-2,2,6-TRIMETHYLCYCLOHEXYL]-3-HEXANOL
1,3,3-TRIMETHYL-2-OXABICYCLO[2.2.2]OCTANE
1,3,3-TRIMETHYL-2-OXABICYCLO[2.2.2]OCTANE
ETHYL HEXANOATE
UNDECANAL
ALDEHYDE C 10
2-PHENYLETHYL ACETATE
(1S,2S,4S)-1,7,7-TRIMETHYLBICYCLO[2.2.1]HEPTAN-2-OL (A) + (1S,2R,4S)-1,7,7-TRIMETHYLBICYCLO[2.2.1]HEPTAN-2-OL (B)
(+−)-3,7-DIMETHYL-3-OCTANOL
1-METHYL-4-(2-PROPANYLIDENE)CYCLOHEXENE
(+)-(R)-4-(2-METHOXYPROPAN-2-YL)-1-METHYLCYCLOHEX-1-ENE
VERDYL ACETATE
(3R)-1-[(1R,6S)-2,2,6-TRIMETHYLCYCLOHEXYL]-3-HEXANOL (A) + (3S)-1-[(1R,6S)-2,2,6-TRIMETHYLCYCLOHEXYL]-3-HEXANOL (B) + (3R)-1-[(1S,6S)-2,2,6-TRIMETHYLCYCLOHEXYL]-3-HEXANOL (C)
(+)-(1S, 1'R)-2-[1-(3',3'-DIMETHYL-1'-CYCLOHEXYL)ETHOXY]-2-METHYLPROPYL PROPANOATE

According to an embodiment, the oil-based core comprises 2-75 wt % of a density balancing material having a density greater than 1.07 g/cm$^3$ and 25-98 wt % of a perfume oil comprising at least 15 wt % of high impact perfume raw materials having a Log T<−4.

The density of a component is defined as the ratio between its mass and its volume (g/cm$^3$).

Several methods are available to determine the density of a component.

One may refer for example to the ISO 298:1998 method to measure d20 densities of essential oils.

According to an embodiment, the density balancing material is chosen in the group consisting of benzyl salicylate, benzyl benzoate, cyclohexyl salicylate, benzyl phenylacetate, phenylethyl phenoxyacetate, triacetin, methyl and ethyl salicylate, benzyl cinnamate, and mixtures thereof.

According to a particular embodiment, the density balancing material is chosen in the group consisting of benzyl salicylate, benzyl benzoate, cyclohexyl salicylate and mixtures thereof.

By "flavour ingredient or composition" it is meant here a flavouring ingredient or a mixture of flavouring ingredients, solvent or adjuvants of current use for the preparation of a flavouring formulation, i.e. a particular mixture of ingredients which is intended to be added to an edible composition or chewable product to impart, improve or modify its organoleptic properties, in particular its flavour and/or taste. Taste modulator as also encompassed in said definition. Flavouring ingredients are well known to a skilled person in the art and their nature does not warrant a detailed description here, which in any case would not be exhaustive, the skilled flavourist being able to select them on the basis of his general knowledge and according to the intended use or application and the organoleptic effect it is desired to achieve. Many of these flavouring ingredients are listed in reference texts such as in the book by S. Arctander, Perfume and Flavor Chemicals, 1969, Montclair, N.J., USA, or its more recent versions, or in other works of similar nature such as Fenaroli's Handbook of Flavor Ingredients, 1975, CRC Press or Synthetic Food Adjuncts, 1947, by M. B. Jacobs, can Nostrand Co., Inc. Solvents and adjuvants or current use for the preparation of a flavouring formulation are also well known in the art.

In a particular embodiment, the flavour is selected from the group consisting of terpenic flavours including citrus and mint oil, and sulfury flavours.

According to a particular embodiment, the hydrophobic material is free of any active ingredient (such as perfume). According to this particular embodiment, it comprises, preferably consists of hydrophobic solvents, preferably chosen in the group consisting of isopropyl myristate, tryglycerides (e.g. Neobee® MCT oil, vegetable oils), D-limonene, silicone oil, mineral oil, and mixtures thereof with optionally hydrophilic solvents preferably chosen in the group consisting of 1,4 butanediol, benzyl alcohol, triethyl citrate, triacetin, benzyl acetate, ethyl acetate, propylene glycol (1,2-propanediol), 1,3-Propanediol, dipropylene glycol, glycerol, glycol ethers and mixtures thereof.

According to any one of the invention's embodiment, the oil represents between about 10% and 60% w/w, or even between 20% and 50% w/w, by weight, relative to the total weight of the dispersion.

According to the invention, the aqueous phase comprises a "globular" protein.

By "globular" protein, it should be understood a spherical protein characterized by a tertiary structure in the native state, and able to unfold and aggregate under the action of heat, pressure or specific chemicals.

As non-limiting examples of globular protein that can be used in the invention, one may cite whey protein, beta-lactoglobulin, ovalbumine, bovine serum albumin, vegetable proteins, and mixtures thereof.

According to a particular embodiment, the protein is whey protein.

The weight ratio between the oil phase and the protein is preferably comprised between 1 and 10, more preferably between 2 and 4.

The protein in the aqueous solution is used as an emulsifier and allows the stabilization of the oil droplets therein. The mean droplet size is preferably greater than 10 microns, preferably comprised between 10 and 500 microns, preferably between 15 and 500 microns, more preferably between 20 and 500 microns.

The emulsion may be prepared by high shear mixing and adjusted to the desired droplet size. The droplet size can be checked with light scattering measurements or microscopy. This procedure does not require a more detailed description here as it is well known to a skilled person in the art.

According to a particular embodiment, before the emulsion formation, the aqueous phase comprising the protein is formerly heated (at a temperature slightly below or about to $T_{den}$ (denaturation temperature) and for a short period of time) to initiate the denaturation of the protein. According to this embodiment, the aqueous solution may be heated between 75° C. and 80° C., preferably during 5 and 15 minutes and then cooled down before the mixing with the oil phase. This enables the display of hydrophobic moieties and better adsorption at the 0/W interface.

Step b) Adding an Aqueous Solution Comprising a Polysaccharide into the Oil-in-Water Emulsion In step b) of the process, an aqueous solution of a polysaccharide is added in the oil-in-water emulsion stabilized with the protein.

Polysaccharide that can be used in the present invention may be pectin, carrageenans, alginate, and mixtures thereof.

According to a particular embodiment, the polysacharide is pectin.

Pectins are polysaccharides extracted from plants and containing methoxyl groups on their sugar moieties in the native form. They are characterized by a esterification degree (DE). In the present invention, the pectin used for the complex formation with the protein is preferably a high methoxy (ie high DE) pectin (HMP). The high methoxy pectin is particularly useful to avoid the microcapsules aggregation.

Without being bound by any theory, the inventors are of the opinion that, when the polysaccharide is added into the oil-in-water emulsion of step a), the polysaccharide interacts with the protein to form protein/polysaccharide complexes at the oil-water interface in which at least one part of the added polysaccharide is adsorbed onto the protein.

Those protein/polysaccharide complexes limit a bulk aggregation of the microcapsules during the denaturation and also improve the shell rigidity once formed.

The weight ratio between the protein and the polysaccharide is preferably comprised between 1 and 10, more preferably comprised between 3 and 8.

To improve the aggregation of the protein to form the membrane, the process of the invention may comprise a further step consisting in adding a salt solution, preferably a calcium solution in the emulsion obtained in step a) and/or in the mixture obtained in step b).

According to this embodiment, the weight ratio between the protein and calcium is preferably comprised between 1 and 10, more preferably between 2 and 4.

After step b), the pH is preferably comprised between 4 and 6, more preferably between 5 and 5.5.

Step c) Applying Sufficient Conditions to Induce the Denaturation of the Protein so as to Form Core-Shell Microcapsules in the Form of a Slurry Methods for denaturation of proteins are well-known from the person skilled in the art. As non-limiting examples, according to the invention, denaturation of proteins can be induced by heat, by high pressure treatment, by combinations of heat and pressure treatments, by addition of alcohols, by addition of acids or bases, by addition of salts including heavy metal salts (e.g. silver nitrate), or by chemical denaturation with chaotropic agents such as urea, guanidinium chloride or sodium dodecyl sulfate or disulfide bond reducers, such as 2-mercaptoethanol or dithiothreitol.

According to an embodiment, in step c) of the process, a heating step is carried out to denature the protein and induce the aggregation of the protein/polysaccharides complexes at the oil-water interface. A core-shell capsule slurry is obtained.

The heating step can be carried out at a temperature $T_{den}$ (denaturation temperature of the protein), preferably comprised between 50° C. and 100° C., more preferably between 80° C. and 100° C. The duration of the heating step will depend on the heating temperature. Typically, the duration of the heating step is comprised between 10 and 60 minutes.

According to the nature of the protein, the person skilled in the art will be able to find a suitable temperature to induce the denaturation of said protein.

As non-limiting examples, the denaturation temperature $T_{den}$ of:
whey protein is comprised between 70 and 90° C.
soy protein is comprised between 70 and 90° C.
bovine serum albumin is comprised between 50 and 82° C.
ovalbumin is comprised between 68 and 80° C.
potato protein is comprised between 50 and 90° C.

The heating step is preferably performed at a pH comprised between 4 and 6, more preferably between 5 and 5.5.

Optional Cross-Linking Step(s):

Depending to the targeted applications, it could be interesting to improve the barrier properties of the biopolymer membrane.

One may use enzymatic and/or chemical cross-linker(s) to densify the membrane of the microcapsules.

According to an embodiment, a crosslinker, preferably chosen in the group consisting of transglutaminase, glutaraldehyde, genipin, and mixtures thereof is added in the mixture obtained in step b) and/or in the mixture obtained in step c).

According to this embodiment, the cross-linker is used in an amount comprised between 0.1 and 2% based on the microcapsule slurry.

According to another embodiment, the process comprises the steps of:
a) dispersing an oil phase comprising a hydrophobic material, preferably a flavor or a perfume, and a polyfunctional monomer, into an aqueous phase comprising a protein to form an oil-in-water emulsion;
b) adding an aqueous solution comprising a polysaccharide into the oil-in-water emulsion;
c) applying conditions sufficient to induce interfacial polymerization of the monomer to form an inner shell; and
d) applying sufficient conditions, preferably by heating the mixture obtained in step c) at a temperature $T_{den}$ to induce the denaturation of the protein so as to form an outer shell.

According to this embodiment, a polyfunctional monomer is further added into the oil phase in addition to the hydrophobic material.

By "polyfunctional polymer", it is meant a molecule that, as unit, reacts or binds chemically to form a polymer or supramolecular polymer. The polyfunctional polymer of the invention has at least two functions capable of forming a microcapsule shell.

The polyfunctional monomer may be chosen in the group consisting of at least one polyisocyanate, poly maleic anhydride, poly acyl chloride, polyepoxide, acrylate monomers and polyalkoxysilane.

The polyfunctional monomer used in the process according to the invention is present in amounts representing from 0.1 to 15%, preferably from 0.5 to 10% and more preferably from 0.5 to 6%, and even more preferably between 2 and 4% by weight of the oil phase.

According to a particular embodiment, the monomer added in step a) is at least one polyisocyanate having at least two isocyanate functional groups.

Suitable polyisocyanates used according to the invention include aromatic polyisocyanate, aliphatic polyisocyanate and mixtures thereof. Said polyisocyanate comprises at least 2, preferably at least 3 but may comprise up to 6, or even only 4, isocyanate functional groups. According to a particular embodiment, a triisocyanate (3 isocyanate functional groups) is used.

According to one embodiment, said polyisocyanate is an aromatic polyisocyanate.

The term "aromatic polyisocyanate" is meant here as encompassing any polyisocyanate comprising an aromatic moiety. Preferably, it comprises a phenyl, a toluyl, a xylyl, a naphthyl or a diphenyl moiety, more preferably a toluyl or a xylyl moiety. Preferred aromatic polyisocyanates are biurets, polyisocyanurates and trimethylol propane adducts of diisocyanates, more preferably comprising one of the above-cited specific aromatic moieties. More preferably, the aromatic polyisocyanate is a polyisocyanurate of toluene diisocyanate (commercially available from Bayer under the tradename Desmodur® RC), a trimethylol propane-adduct of toluene diisocyanate (commercially available from Bayer under the tradename Desmodur® L75), a trimethylol propane-adduct of xylylene diisocyanate (commercially available from Mitsui Chemicals under the tradename Takenate® D-110N). In a most preferred embodiment, the aromatic polyisocyanate is a trimethylol propane-adduct of xylylene diisocyanate.

According to another embodiment, said polyisocyanate is an aliphatic polyisocyanate. The term "aliphatic polyisocyanate" is defined as a polyisocyanate which does not comprise any aromatic moiety. Preferred aliphatic polyisocyanates are a trimer of hexamethylene diisocyanate, a trimer of isophorone diisocyanate, a trimethylol propane-adduct of hexamethylene diisocyanate (available from Mitsui Chemicals) or a biuret of hexamethylene diisocyanate (commercially available from Bayer under the tradename Desmodur® N 100), among which a biuret of hexamethylene diisocyanate is even more preferred.

According to another embodiment, the at least one polyisocyanate is in the form of a mixture of at least one aliphatic polyisocyanate and of at least one aromatic polyisocyanate, both comprising at least two or three isocyanate functional groups, such as a mixture of a biuret of hexamethylene diisocyanate with a trimethylol propane-adduct of xylylene diisocyanate, a mixture of a biuret of hexamethylene diisocyanate with a polyisocyanurate of toluene diisocyanate and a mixture of a biuret of hexamethylene diisocyanate with a trimethylol propane-adduct of toluene diisocyanate. Most preferably, it is a mixture of a biuret of hexamethylene diisocyanate with a trimethylol propane-adduct of xylylene diisocyanate. Preferably, when used as a mixture the molar ratio between the aliphatic polyisocyanate and the aromatic polyisocyanate is ranging from 80:20 to 10:90.

According to an embodiment, the at least one polyisocyanate used in the process of the invention is present in amounts representing from 0.1 to 15%, preferably from 0.5 to 10% and more preferably from 0.5 to 6%, and even more preferably between 2 and 4% by weight of the oil phase.

When a polyfunctional monomer is added in the oil phase, the process comprises a further step consisting in applying conditions sufficient to induce interfacial polymerization of the polyfunctional monomer to form an inner shell.

The inner shell of the microcapsules is the result of the interfacial polymerization between the polyfunctional monomer and the functional groups of the protein or between the polyfunctional monomer and water.

No specific action is required to induce interfacial polymerization. Preferably, the mixture obtained is step b) is maintained under stirring for 2 to 15 hours, preferably for 2 to 10 hours.

To increase the reaction kinetics, the stirring can be made at a pH comprised between 7 and 10 and/or at a temperature comprised between 50 and 70° C. (which has to be lower than the denaturation temperature of the protein).

The nature of the inner shell depends on the nature of the monomer present in the oil phase. According to an embodiment, the inner shell is polyurea shell.

Optional Outer Coating

According to a particular embodiment of the invention, at the end of step c) one may also add to the invention's slurry a polymer selected from a non-ionic polysaccharide, a cationic polymer and mixtures thereof to form an outer coating to the microcapsules.

Non-ionic polysaccharide polymers are well known to a person skilled in the art and are described for instance in WO2012/007438 page 29, lines 1 to 25 and in WO2013/026657 page 2, lines 12 to 19 and page 4, lines 3 to 12. Preferred non-ionic polysaccharides are selected from the group consisting of locust bean gum, xyloglucan, guar gum, hydroxypropyl guar, hydroxypropyl cellulose and hydroxypropyl methyl cellulose.

Cationic polymers are well known to a person skilled in the art. Preferred cationic polymers have cationic charge densities of at least 0.5 meq/g, more preferably at least about 1.5 meq/g, but also preferably less than about 7 meq/g, more preferably less than about 6.2 meq/g. The cationic charge density of the cationic polymers may be determined by the Kjeldahl method as described in the US Pharmacopoeia under chemical tests for Nitrogen determination. The preferred cationic polymers are chosen from those that contain units comprising primary, secondary, tertiary and/or quaternary amine groups that can either form part of the main polymer chain or can be borne by a side substituent directly connected thereto. The weight average (Mw) molecular weight of the cationic polymer is preferably between 10,000 and 3.5M Dalton, more preferably between 50,000 and 1.5M Dalton. According to a particular embodiment, one will use cationic polymers based on acrylamide, methacrylamide, N-vinylpyrrolidone, quaternized N,N-dimethylaminomethacrylate, diallyldimethylammonium chloride, quaternized vinylimidazole (3-methyl-1-vinyl-1H-imidazol-3-ium chloride), vinylpyrrolidone, acrylamidopropyltrimonium chloride, cassia hydroxypropyltrimonium chloride, guar hydroxypropyltrimonium chloride or polygalactomannan 2-hydroxypropyltrimethylammonium chloride ether, starch hydroxypropyltrimonium chloride and cellulose hydroxypropyltrimonium chloride. Preferably copolymers shall be selected from the group consisting of polyquaternium-5, polyquaternium-6, polyquaternium-7, polyquaternium10, polyquaternium-11, polyquaternium-16, polyquaternium-22, polyquaternium-28, polyquaternium-43, polyquaternium-44, polyquaternium-46, cassia hydroxypropyltrimonium chloride, guar hydroxypropyltrimonium chloride or polygalactomannan 2-hydroxypropyltrimethylammonium chloride ether, starch hydroxypropyltrimonium chloride and cellulose hydroxypropyltrimonium chloride. As specific examples of commercially available products, one may cite Salcare® SC60 (cationic copolymer of acrylamidopropyltrimonium chloride and acrylamide, origin: BASF) or Luviquat®, such as the PQ 11N, FC 550 or Style (polyquaternium-11 to 68 or quaternized copolymers of vinylpyrrolidone origin: BASF), or also the Jaguar® (C13S or C17, origin Rhodia).

According to any one of the above embodiments of the invention, there is added an amount of polymer described above comprised between about 0% and 5% w/w, or even between about 0.1% and 2% w/w, percentage being expressed on a w/w basis relative to the total weight of the slurry as obtained after step c). It is clearly understood by a person skilled in the art that only part of said added polymers will be incorporated into/deposited on the microcapsule shell.

Multiple Microcapsules System

According to an embodiment, the microcapsules of the invention (first microcapsule slurry) can be used in combination with a second microcapsules slurry.

Another object of the invention is a microcapsule delivery system comprising:
the microcapsule slurry of the present invention as a first microcapsule slurry, and
a second microcapsule slurry, wherein the microcapsules contained in the first microcapsule slurry and the second microcapsule slurry differ in their hydrophobic material and/or their wall material and/or in their coating material.

As non-limiting examples, the nature of the polymeric shell of the second microcapsule slurry of the invention can vary. As non-limiting examples, the shell of the second microcapsules slurry can be aminoplast-based, polyurea-based or polyurethane-based. The shell of the second microcapsules slurry can also be hybrid, namely organic-inorganic such as a hybrid shell composed of at least two types of inorganic particles that are cross-linked, or yet a shell resulting from the hydrolysis and condensation reaction of a polyalkoxysilane macro-monomeric composition.

According to an embodiment, the shell of the second microcapsules slurry comprises an aminoplast copolymer, such as melamine-formaldehyde or urea-formaldehyde or cross-linked melamine formaldehyde or melamine glyoxal.

According to another embodiment the shell of the second microcapsules slurry is polyurea-based made from, for example but not limited to isocyanate-based monomers and amine-containing crosslinkers such as guanidine carbonate and/or guanazole. Preferred polyurea microcapsules comprise a polyurea wall which is the reaction product of the polymerisation between at least one polyisocyanate comprising at least two isocyanate functional groups and at least one reactant selected from the group consisting of an amine (for example a water soluble guanidine salt and guanidine); a colloidal stabilizer or emulsifier; and an encapsulated perfume. However, the use of an amine can be omitted. According to a particular embodiment the colloidal stabilizer includes an aqueous solution of between 0.1% and 0.4% of polyvinyl alcohol, between 0.6% and 1% of a cationic copolymer of vinylpyrrolidone and of a quaternized vinylimidazol (all percentages being defined by weight relative to the total weight of the colloidal stabilizer). According to another embodiment, the emulsifier is an anionic or amphiphilic biopolymer preferably chosen from the group consisting of gum Arabic, soy protein, sodium caseinate, gelatin and mixtures thereof.

According to another embodiment, the shell of the second microcapsules slurry is polyurethane-based made from, for example but not limited to polyisocyanate and polyols, polyamide, polyester, etc.

The preparation of an aqueous dispersion/slurry of core-shell microcapsules is well known by a skilled person in the art. In one aspect, said microcapsule wall material may comprise any suitable resin and especially including melamine, glyoxal, polyurea, polyurethane, polyamide, polyester, etc. Suitable resins include the reaction product of an aldehyde and an amine, suitable aldehydes include, formaldehyde and glyoxal. Suitable amines include melamine, urea, benzoguanamine, glycoluril, and mixtures thereof. Suitable melamines include, methylol melamine, methylated methylol melamine, imino melamine and mixtures thereof. Suitable ureas include, dimethylol urea, methylated dimethylol urea, urea-resorcinol, and mixtures thereof. Suitable materials for making may be obtained from one or more of the following companies Solutia Inc. (St Louis, Missouri U.S.A.), Cytec Industries (West Paterson, New Jersey U.S.A.), Sigma-Aldrich (St. Louis, Missouri U.S.A.).

According to a particular embodiment, the second core-shell microcapsule is a formaldehyde-free capsule. A typical process for the preparation of aminoplast formaldehyde-free microcapsules slurry comprises the steps of 1) preparing an oligomeric composition comprising the reaction product of, or obtainable by reacting together
a) a polyamine component in the form of melamine or of a mixture of melamine and at least one $C_1$-$C_4$ compound comprising two $NH_2$ functional groups;
b) an aldehyde component in the form of a mixture of glyoxal, a $C_{4-6}$ 2,2-dialkoxy-ethanal and optionally a glyoxalate, said mixture having a molar ratio glyoxal/$C_{4-6}$ 2,2-dialkoxy-ethanal comprised between 1/1 and 10/1; and
c) a protic acid catalyst;
2) preparing an oil-in-water dispersion, wherein the droplet size is comprised between 1 and 600 um, and comprising:
i. an oil;
ii. a water medium
iii. at least an oligomeric composition as obtained in step 1;
iv. at least a cross-linker selected amongst
A) $C_4$-$C_{12}$ aromatic or aliphatic di- or tri-isocyanates and their biurets, triurets, trimmers, trimethylol propane-adduct and mixtures thereof; and/or
B) a di- or tri-oxiran compounds of formula

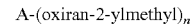

A-(oxiran-2-ylmethyl)$_n$ wherein n stands for 2 or 3 and 1 represents a $C_2$-$C_6$ group optionally comprising from 2 to 6 nitrogen and/or oxygen atoms;
v. optionally a $C_1$-$C_4$ compounds comprising two $NH_2$ functional groups;
3) Heating said dispersion;
4) Cooling said dispersion.
This process is described in more details in WO 2013/068255, the content of which is included by reference.

According to another embodiment, the shell of the of the second microcapsules slurry is polyurea or polyurethane-based. Examples of processes for the preparation of polyurea and polyureathane-based microcapsule slurry are for instance described in WO2007/004166, EP 2300146, EP2579976 the contents of which is also included by reference. Typically a process for the preparation of polyurea or polyurethane-based microcapsule slurry include the following steps:
- a) Dissolving at least one polyisocyanate having at least two isocyanate groups in an oil to form an oil phase;
- b) Preparing an aqueous solution of an emulsifier or colloidal stabilizer to form a water phase;
- c) Adding the oil phase to the water phase to form an oil-in-water dispersion, wherein the mean droplet size is comprised between 1 and 500 μm, preferably between 5 and 50 μm;
- d) Applying conditions sufficient to induce interfacial polymerisation and form microcapsules in form of a slurry.

Process for Preparing a Microcapsule Powder

Another object of the invention is a process for preparing a microcapsule powder comprising the steps as defined above and an additional step d) consisting of submitting the slurry obtained in step c) (after the heating step) to a drying, like spray-drying, to provide the microcapsules as such, i.e. in a powdery form. It is understood that any standard method known by a person skilled in the art to perform such drying is also applicable. In particular the slurry may be spray-dried preferably in the presence of a polymeric carrier material such as polyvinyl acetate, polyvinyl alcohol, dextrins, natural or modified starch, vegetable gums, pectins, xanthans, alginates, carragenans or cellulose derivatives to provide microcapsules in a powder form.

According to a particular embodiment, the carrier material contains free perfume oil which can be same or different from the perfume from the core of the microcapsules.

Microcapsule Slurry/Microcapsule Powder

Other objects of the invention are a microcapsule slurry or microcapsule powder comprising at least one microcapsule made of:
- an oil-based core comprising a hydrophobic material, and
- at least one shell comprising a protein and a polysaccharide, wherein the protein is preferably whey protein and wherein the polysaccharide is preferably pectin.

Definitions regarding the hydrophobic material, polysaccharide, globular protein, polyfunctional monomer are the same as described above for the process for preparing core-shell microcapsules slurry.

Another object of the invention is a microcapsule slurry comprising at least one microcapsules made of:
- an oil-based core comprising a hydrophobic material
- an inner shell made of a polymerized polyfunctional monomer and an outer shell made of a protein, preferably a globular protein and a polysaccharide.
- According to an embodiment, the outer shell comprises pectin and whey protein and/or the inner shell comprises a polymerized polyisocyanate having at least two isocyanate groups.

The shell of the microcapsule of the invention is made of protein/polysaccharides complexes. Microcapsule slurry and microcapsule powder obtainable by the processes above-described are also an object of the invention.

Consumer Products

The microcapsules of the invention can be used for the preparation of perfuming or flavouring compositions which are also an object of the invention.

Flavored Consumer Products

The microcapsules of the invention when encapsulating a flavour, can be used in a great variety of edible end products. Consumer products susceptible of being flavoured by the microcapsules of the invention may include foods, beverages, pharmaceutical and the like. For example foodstuff base that could use the powdered microcapsules of the invention include
- Baked goods (e.g. bread, dry biscuits, cakes, other baked goods),
- Non-alcoholic beverages (e.g. carbonated soft drinks, bottled waters, sports/energy drinks, juice drinks, vegetable juices, vegetable juice preparations),
- Alcoholic beverages (e.g. beer and malt beverages, spirituous beverages),
- Instant beverages (e.g. instant vegetable drinks, powdered soft drinks, instant coffee and tea),
- Cereal products (e.g. breakfast cereals, pre-cooked ready-made rice products, rice flour products, millet and sorghum products, raw or pre-cooked noodles and pasta products),
- Milk products (e.g. fresh cheese, soft cheese, hard cheese, milk drinks, whey, butter, partially or wholly hydrolysed milk protein-containing products, fermented milk products, condensed milk and analogues),
- Dairy based products (e.g. fruit or flavored yoghurt, ice cream, fruit ices)
- Confectionary products (e.g. chewing gum, hard and soft candy)
- Chocolate and compound coatings
- Products based on fat and oil or emulsions thereof (e.g. mayonnaise, spreads, margarines, shortenings, remoulade, dressings, spice preparations),
- Spiced, marinated or processed fish products (e.g. fish sausage, surimi),
- Eggs or egg products (dried egg, egg white, egg yolk, custard),
- Desserts (e.g. gelatins and puddings)
- Products made of soya protein or other soya bean fractions (e.g. soya milk and products made therefrom, soya lecithin-containing preparations, fermented products such as tofu or tempeh or products manufactured therefrom, soya sauces),
- Vegetable preparations (e.g. ketchup, sauces, processed and reconstituted vegetables, dried vegetables, deep frozen vegetables, pre-cooked vegetables, vegetables pickled in vinegar, vegetable concentrates or pastes, cooked vegetables, potato preparations),
- Vegetarian meat replacer, vegetarian burger
- Spices or spice preparations (e.g. mustard preparations, horseradish preparations), spice mixtures and, in particular seasonings which are used, for example, in the field of snacks.
- Snack articles (e.g. baked or fried potato crisps or potato dough products, bread dough products, extrudates based on maize, rice or ground nuts),
- Meat products (e.g. processed meat, poultry, beef, pork, ham, fresh sausage or raw meat preparations, spiced or marinated fresh meat or cured meat products, reformed meat),
- Ready dishes (e.g. instant noodles, rice, pasta, pizza, tortillas, wraps) and soups and broths (e.g. stock, savory cube, dried soups, instant soups, pre-cooked soups, retorted soups), sauces (instant sauces, dried sauces, ready-made sauces, gravies, sweet sauces).

Preferably, the microcapsules according to the invention shall be used in products selected from the group consisting of baked goods, instant beverages, cereal products, milk products, dairy-based products, products based on fat and oil or emulsions thereof, desserts, vegetable preparations, vegetarian meat replacer, spices and seasonings, snacks, meat products, ready dishes, soups and broths and sauces.

Perfumed Consumer Products

The microcapsules of the invention can be used in combination with active ingredients. An object of the invention is therefore a composition comprising:
(i) microcapsules as defined above;
(ii) an active ingredient, preferably chosen in the group consisting of a cosmetic ingredient, skin caring ingredient, perfume ingredient, flavor ingredient, malodour counteracting ingredient, bactericide ingredient, fungicide ingredient, pharmaceutical or agrochemical ingredient, a sanitizing ingredient, an insect repellent or attractant, and mixtures thereof.

The microcapsules of the invention can also be added in different perfumed consumer products.

In particular a perfuming composition comprising (i) microcapsules as defined above; (ii) at least one perfuming co-ingredient; and (iii) optionally a perfumery adjuvant, is another object of the invention.

By "perfuming co-ingredient" it is meant here a compound, which is used in a perfuming preparation or a composition to impart a hedonic effect and which is not a microcapsule as defined above. In other words such a co-ingredient, to be considered as being a perfuming one, must be recognized by a person skilled in the art as being able to impart or modify in a positive or pleasant way the odor of a composition, and not just as having an odor. The nature and type of the perfuming co-ingredients present in the perfuming composition do not warrant a more detailed description here, which in any case would not be exhaustive, the skilled person being able to select them on the basis of his general knowledge and according to the intended use or application and the desired organoleptic effect. In general terms, these perfuming co-ingredients belong to chemical classes as varied as alcohols, lactones, aldehydes, ketones, esters, ethers, acetates, nitriles, terpenoids, nitrogenous or sulphurous heterocyclic compounds and essential oils, and said perfuming co-ingredients can be of natural or synthetic origin. Many of these co-ingredients are in any case listed in reference texts such as the book by S. Arctander, Perfume and Flavor Chemicals, 1969, Montclair, New Jersey, USA, or its more recent versions, or in other works of a similar nature, as well as in the abundant patent literature in the field of perfumery. It is also understood that said co-ingredients may also be compounds known to release in a controlled manner various types of perfuming compounds.

By "perfumery adjuvant" we mean here an ingredient capable of imparting additional added benefit such as a color, a particular light resistance, chemical stability, etc. A detailed description of the nature and type of adjuvant commonly used in perfuming bases cannot be exhaustive, but it has to be mentioned that said ingredients are well known to a person skilled in the art.

Preferably, the perfuming composition according to the invention comprises between 0.1 and 30% by weight of microcapsules as defined above.

The invention's microcapsules can advantageously be used in many application fields and used in consumer products. Microcapsules can be used in liquid form applicable to liquid consumer products as well as in powder form, applicable to powder consumer products.

In the case of microcapsules including a perfume oil-based core, the products of the invention, can in particular be of used in perfumed consumer products such as product belonging to fine fragrance or "functional" perfumery. Functional perfumery includes in particular personal-care products including hair-care, body cleansing, skin care, hygiene-care as well as home-care products including laundry care and air care. Consequently, another object of the present invention consists of a perfumed consumer product comprising as a perfuming ingredient, the microcapsules defined above or a perfuming composition as defined above. The perfume element of said consumer product can be a combination of perfume microcapsules as defined above and free or non-encapsulated perfume, as well as other types of perfume microcapsule than those here-disclosed.

In particular a liquid consumer product comprising:
from 2 to 65% by weight, relative to the total weight of the consumer product, of at least one surfactant;
water or a water-miscible hydrophilic organic solvent; and
a perfuming composition or microcapsules as defined above, wherein the hydrophobic material comprises a perfume is another object of the invention.

Also a powder consumer product comprising
from 2 to 65% by weight, relative to the total weight of the consumer product, of at least one surfactant; and
a perfuming composition or microcapsules, wherein the hydrophobic material comprises a perfume as defined above is part of the invention.

According to a particular embodiment, the process for preparing the microcapsules comprised in the perfumed consumer product comprises a cross-linking step as defined above (chemically and/or enzymatically) to improve the stability in challenging bases comprising a high amount of surfactants.

The invention's microcapsules can therefore be added as such or as part of an invention's perfuming composition in a perfumed consumer product.

For the sake of clarity, it has to be mentioned that, by "perfumed consumer product" it is meant a consumer product which is expected to deliver among different benefits a perfuming effect to the surface to which it is applied (e.g. skin, hair, textile, paper, or home surface) or in the air (air-freshener, deodorizer etc). In other words, a perfumed consumer product according to the invention is a manufactured product which comprises a functional formulation also referred to as "base", together with benefit agents, among which an effective amount of microcapsules according to the invention.

The nature and type of the other constituents of the perfumed consumer product do not warrant a more detailed description here, which in any case would not be exhaustive, the skilled person being able to select them on the basis of his general knowledge and according to the nature and the desired effect of said product. Base formulations of consumer products in which the microcapsules of the invention can be incorporated can be found in the abundant literature relative to such products. These formulations do not warrant a detailed description here which would in any case not be exhaustive. The person skilled in the art of formulating such consumer products is perfectly able to select the suitable components on the basis of his general knowledge and of the available literature.

Non-limiting examples of suitable perfumed consumer product can be a perfume, such as a fine perfume, a cologne, an after-shave lotion, a body-splash; a fabric care product, such as a liquid or solid detergent, tablets and pods, a fabric softener, a dryer sheet, a fabric refresher, an ironing water, or a bleach; a personal-care product, such as a hair-care product (e.g. a shampoo, hair conditioner, a colouring preparation or a hair spray), a cosmetic preparation (e.g. a vanishing cream, body lotion or a deodorant or antiperspirant), or a skin-care product (e.g. a perfumed soap, shower or bath mousse, body wash, oil or gel, bath salts, or a hygiene product); an air care product, such as an air freshener or a "ready to use" powdered air freshener; or a home care product, such all-purpose cleaners, liquid or power or tablet dishwashing products, toilet cleaners or products for cleaning various surfaces, for example sprays & wipes intended for the treatment/refreshment of textiles or hard surfaces (floors, tiles, stone-floors etc.); a hygiene product such as sanitary napkins, diapers, toilet paper.

Another object of the invention is a consumer product comprising:
  a personal care active base, and
  microcapsules as defined above or the perfuming composition as defined above,
wherein the consumer product is in the form of a personal care composition.

Personal care active base in which the microcapsules of the invention can be incorporated can be found in the abundant literature relative to such products. These formulations do not warrant a detailed description here which would in any case not be exhaustive. The person skilled in the art of formulating such consumer products is perfectly able to select the suitable components on the basis of his general knowledge and of the available literature.
The personal care composition is preferably chosen in the group consisting of a hair-care product (e.g. a shampoo, hair conditioner, a colouring preparation or a hair spray), a cosmetic preparation (e.g. a vanishing cream, body lotion or a deodorant or antiperspirant), a skin-care product (e.g. a perfumed soap, shower or bath mousse, body wash, oil or gel, bath salts, or a hygiene product), oral care product (toothpaste or mouthwash composition) or a fine fragrance product (e.g. Eau de Toilette—EdT).

Another object of the invention is a consumer product comprising:
  a home care or a fabric care active base, and
microcapsules as defined above or the perfuming composition as defined above, wherein the consumer product is in the form of a home care or a fabric care composition.

Home care or fabric care bases in which the microcapsules of the invention can be incorporated can be found in the abundant literature relative to such products. These formulations do not warrant a detailed description here which would in any case not be exhaustive. The person skilled in the art of formulating such consumer products is perfectly able to select the suitable components on the basis of his general knowledge and of the available literature.
The home or fabric care composition is preferably chosen in the group consisting fabric softener, liquid detergent, powder detergent, liquid scent booster solid scent booster.

According to a particular embodiment, the consumer product is in the form of a fabric softener composition and comprises:
  between 85 and 99.9% of a fabric softener active base;
  between 0.1 to 15 wt %, more preferably between 0.2 and 5 wt % by weight of the microcapsule slurry of the invention.
  The fabric softener active base may comprise cationic surfactants of quaternary ammonium, such as Diethyl ester dimethyl ammonium chloride (DEEDMAC), TEAQ (triethanolamine quat), HEQ (Hamburg esterquat), and mixtures thereof.

According to a particular embodiment, the consumer product is in the form of a perfuming composition comprising:
  0.1 to 20% of microcapsules as defined previously,
  0 to 40%, preferably 3-40% of perfume, and
  40-90% of ethanol, by weight based on the total weight of the perfuming composition.

Preferably, the consumer product comprises from 0.1 to 15 wt %, more preferably between 0.2 and 5 wt % of the microcapsules of the present invention, these percentages being defined by weight relative to the total weight of the consumer product. Of course the above concentrations may be adapted according to the benefit effect desired in each product.

The invention will now be further described by way of examples. It will be appreciated that the invention as claimed is not intended to be limited in any way by these examples.

EXAMPLES

Example 1

Preparation of Microcapsules by the Process of the Invention

Figure 2:
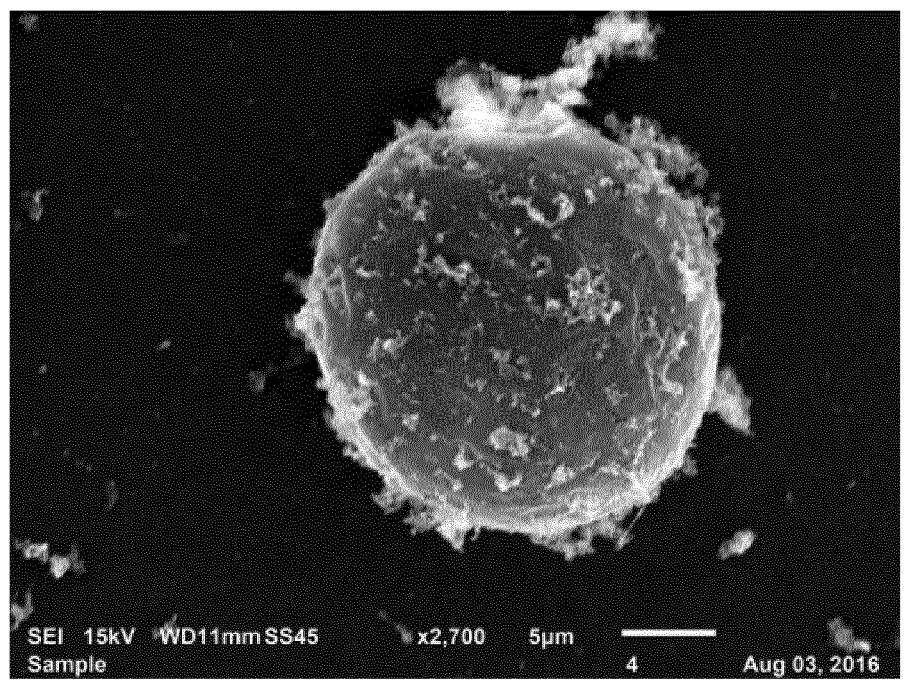
FIG. 2 is a SEM picture of a microcapsule of the invention (WPI/HMP=8 (w/w)).

Microcapsules A were prepared as follows.
7 g limonene were emulsified in 80 g WPI (Whey protein, Davisco) 2 wt % solution prepared in DI water, using an ultra turrax. Then, 10 g HMP (High methoxy pectin, Fluka) 2 wt % were then added under stirring to form WPI/HMP complex particles, so that WPI/HMP=8 (w/w).
Then, the pH was adjusted to 5.35 using dilute NaOH and lactic acid solutions.
The emulsion was then heated to 85° C. for 1 hour to induce the aggregation of the protein and form a microcapsules slurry (see FIG. 1 and FIG. 2).

Example 2

Preparation of Comparative Microcapsules

Figure 3:
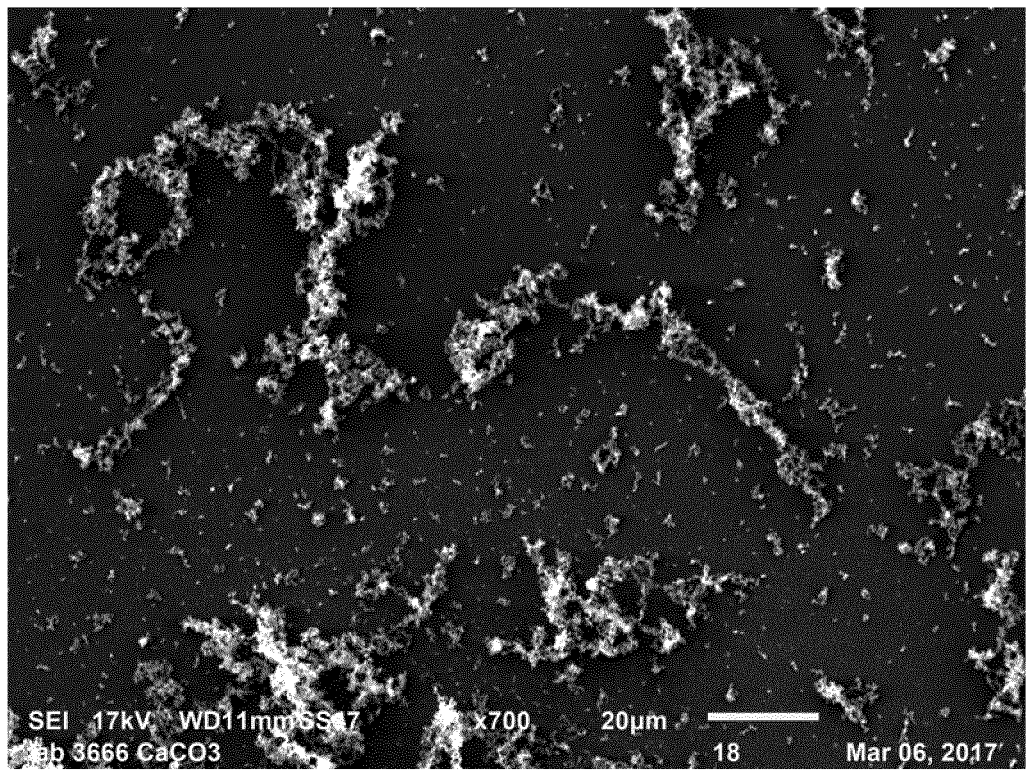
FIG. 3 is a SEM picture of a comparative microcapsule (Pectin added before the oil-in-water emulsion).

This example shows the importance of preparing the WPI-stabilized emulsion before preparing the WPI/HMP complex particles.
In this example, the WPI/HMP=8 complex particles were prepared before adding the oil and emulsifying. Then, 10 g of WPI 5% solution was mixed with 3.1 g of HMP 2% solution and the pH was adjusted to 5.1.
1 g limonene was then added and the emulsion was formed by shearing with the ultra turrax. Finally, the emulsion was heated to 85° C. for 1 hour. No membrane was formed around the oil droplets (see FIG. 3).

Example 3

Preparation of Comparative Microcapsules

Comparative microcapsules X without pectin were prepared as follows:
  15 g limonene were added to 50 g WPI 10% solution and sheared with the ultra-turrax for 1 minute at 24000 rpm. Then, a solution of 2.5 g $CaCl_2$ (Acros) in 10 g deionized water was added slowly under stirring. The pH was then adjusted to 5.48 with dilute lactic acid and NaOH solutions, before heating the emulsion in a water bath at 85° C. for 30 minutes with an overhead mechanical stirrer.

Example 4

Preparation of Microcapsules by the Process of the Invention

WPI/HMP microcapsules were prepared at pH~5.4 with different WPI/HMP ratios.

TABLE 1

| Microcapsule compostions | | | | | | | | |
|---|---|---|---|---|---|---|---|---|
| | REFERENCE Comparative X | | WPI/HMP 8/1 Capsule A | | WPI/HMP 5/1 Capsule B | | WPI/HMP 3/1 Capsule C | |
| | g solution | % | g solution | % | g solution | % | g solution | % |
| WPI 10% | 50 | 6.5% | 50 | 4.6% | 50 | 3.9% | 50 | 3.1% |
| limonene | 15 | 19.4% | 15 | 13.8% | 15 | 11.8% | 15 | 9.3% |
| CaCl2 96% | 2.5 | 3.1% | 2.5 | 2.2% | 2.5 | 1.9% | 2.5 | 1.5% |
| DI Water | 10 | 0.0% | 10 | 0.0% | 10 | 0.0% | 10 | 0.0% |
| HMP 2% | 0 | 0.0% | 31 | 0.6% | 50 | 0.8% | 83.3 | 1.0% |
| pH | 5.48 | | 5.54 | | 5.4 | | 5.35 | |

For each sample, the WPI aqueous solution was denatured by heating 5 minutes at 80° C. After cooling down, the limonene was sheared in the WPI solution for 1 minute at 24000 rpm (ultra turrax) and the $CaCl_2$ solution was added under stirring. Then, the HMP solution was added still under stirring before adjusting the pH at circa 5.4 with dilute NaOH and lactic acid solutions, and heating at 85° C. for 30 minutes, while mechanically stirring using an overhead stirrer.

The microcapsules slurries obtained were allowed to cool down.

Figure 4:
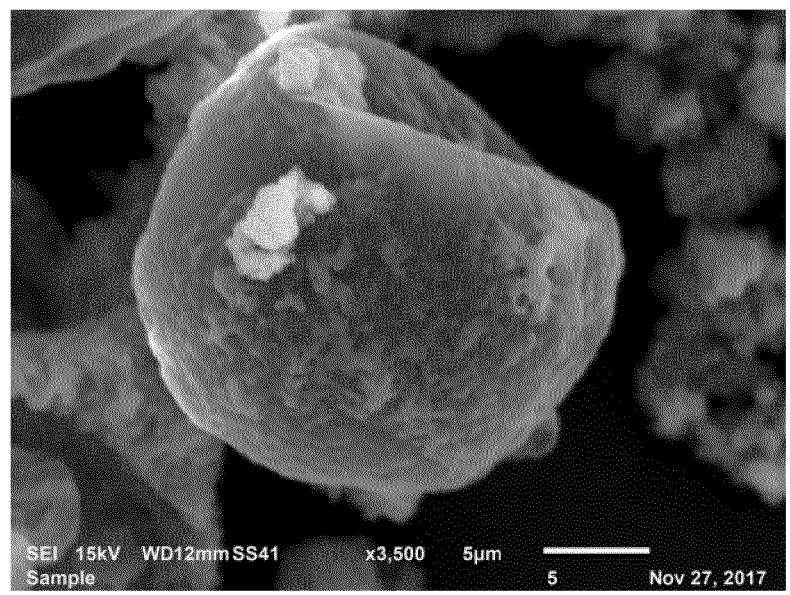
FIG. 4 is a SEM picture of a microcapsule of the invention (WPI/HMP=8 (w/w)).
Figure 5:
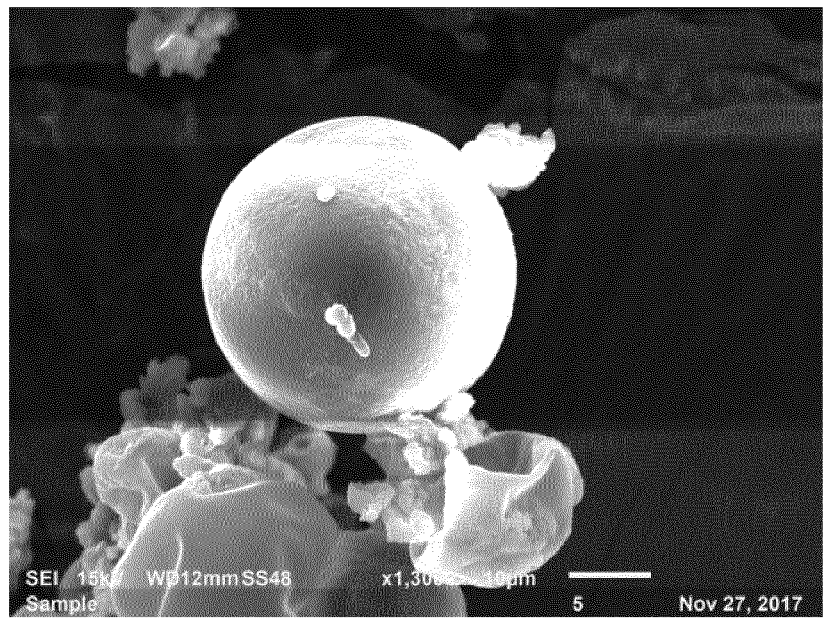
FIG. 5 is a SEM picture of a microcapsule of the invention (WPI/HMP=5 (w/w)).
Figure 6:
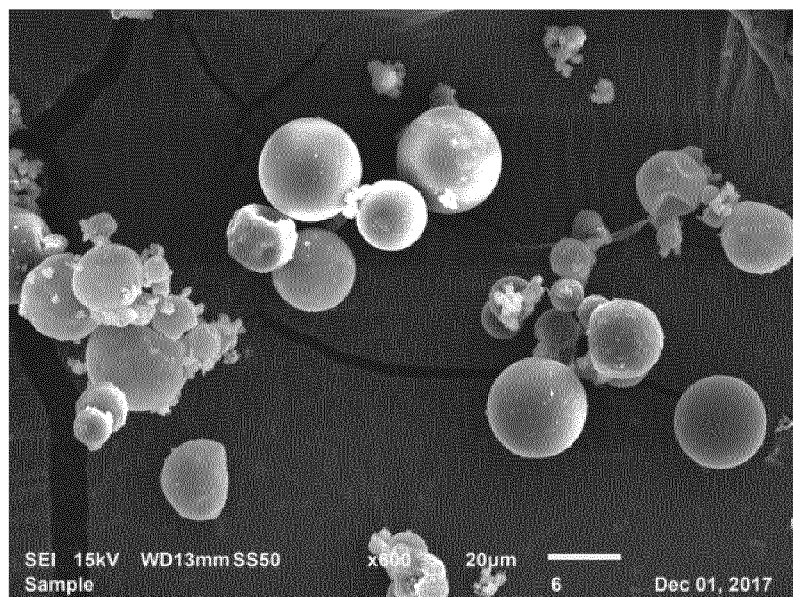
FIG. 6 is a SEM picture of a microcapsule of the invention (WPI/HMP=3 (w/w)).
Figure 7:
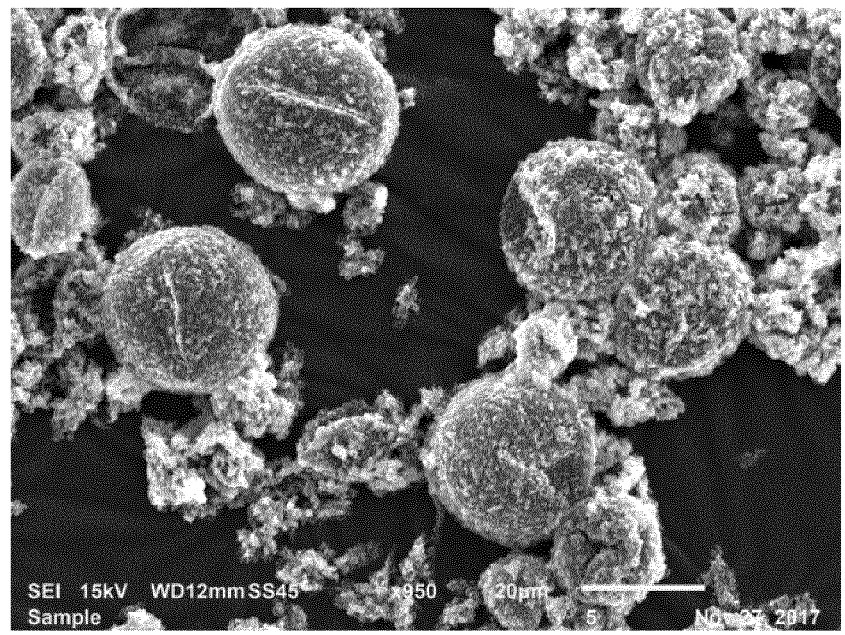
FIG. 7 is a SEM picture of a comparative microcapsule (pectin not added during the process).

One can note from SEM pictures that the surface of the microcapsule of the invention (A, B and C—see FIGS. 4,5,6 respectively) is smoother than for comparative microcapsules X (FIG. 7) underlying the presence of pectin in the membrane.

Example 5

Preparation of Microcapsules by the Process of the Invention 9 g of a perfume oil A (see table 2) were added to 30 g of WPI solution (non-denatured at 80° C.) and sheared with an ultra-turrax to form an emulsion. Then, a solution of 1.8 g $CaCl_2$ in 6 g water was added slowly while stirring, followed by 19.4 g of HMP 2% solution. After 15 minutes stirring, the emulsion was heated in a water bath at 85° C. for 1 hour, while stirring with an over-head stirrer. Microcapsules D were obtained.

TABLE 2

| Perfume oil A composition | |
|---|---|
| Raw material | wt % |
| Romascone ®[a] | 20 |
| Verdox ™[b] | 20 |
| Lorysia ®[c] | 20 |
| 3-(4-isopropylphenyl)-2-methylpropanal | 20 |
| Salicynile ®[d] | 20 |

Figure 8:
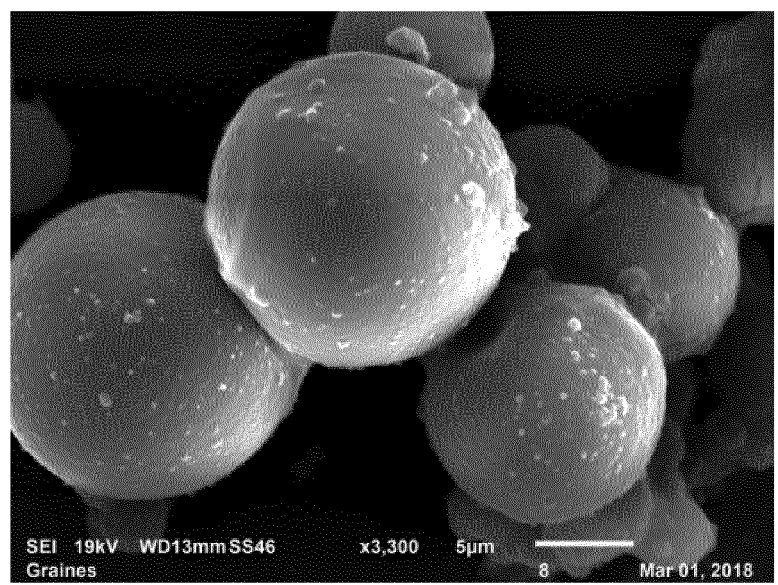
FIG. 8 is a SEM picture of a microcapsule of the invention (WPI/HMP=8 (w/w)).

[a] Methyl 2,2-dimethyl-6-methylene-1-cyclohexanecarboxylate, origin: Firmenich SA, Geneva, Switzerland
[b] 2-tert-butyl-1-cyclohexyl acetate, trademark from International Flavors & Fragrances, USA
[c] 4-(1,1-diméthyléthyl)-1-cyclohexyl acetate, origin: Firmenich SA, Geneva, Switzerland
[d] (2Z)-2-phenyl-2-hexenenitrile, origin: Firmenich SA, Geneva, Switzerland As shown in FIG. 8, the microcapsules obtained have a smooth surface and are spherical.

Figure 9:
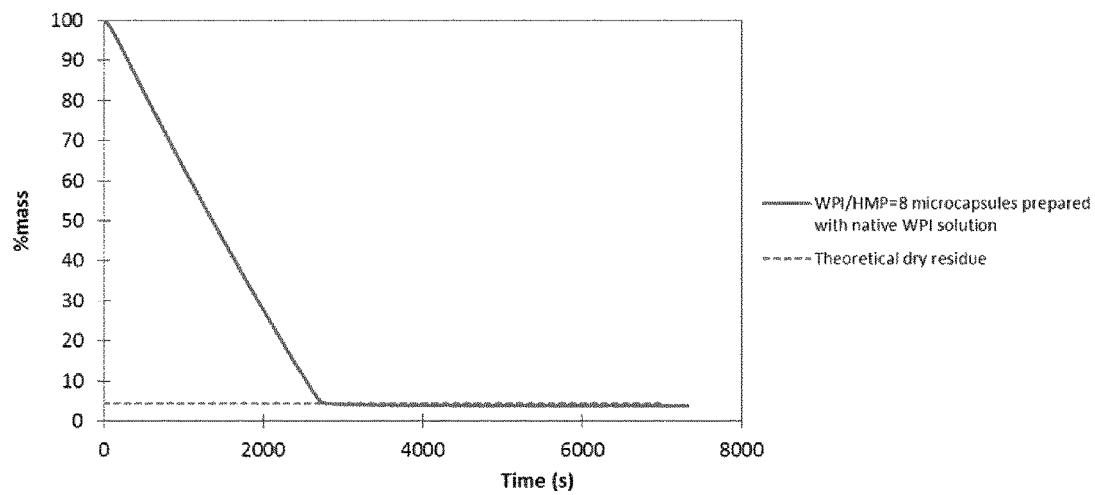
FIG. 9 is the thermogravimetric analysis at 50° C. of sample D diluted five-fold.

One may also observe that at the end of a TGA analysis—Temperature program: 30-50° C. at 10° C./min, 120 minutes at 50° C. (see FIG. 9), the dry residue stands slightly below the theoretical dry residue, and corresponds to a retention of 82% of the initially encapsulated perfume.

Example 6

Evaluation of the Barrier Properties of the WPI/HMP Membranes

To compare the volatiles retention as a function of the WPI/HMP ratio, the microcapsules slurries obtained in example 3 were diluted 20 times before applying ca 200 mg of diluted suspension on glass slides (dilution was performed to avoid HMP film-formation upon drying). The suspensions were allowed to dry onto the slides for 3 days. Afterwards, the dry residue was scratched with a spatula and the perfume released in the headspace was measured under a glass bell using a photoionization detector (Tiger).

Figure 10:
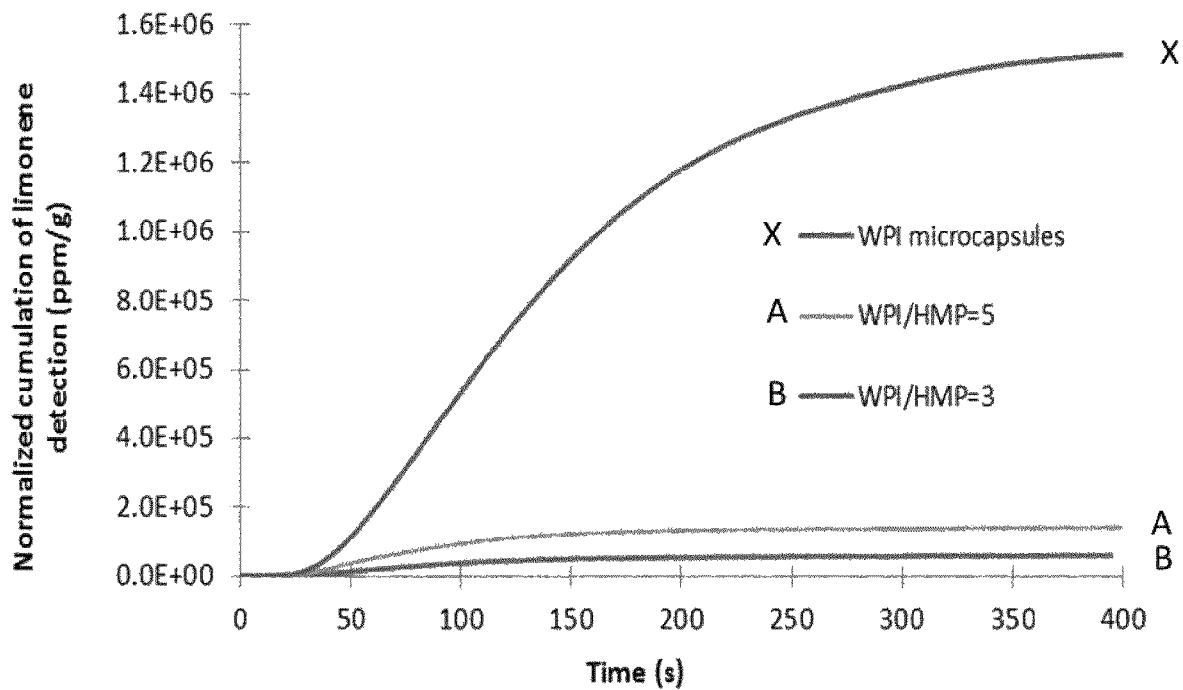
FIG. 10 represents the limonene released from microcapsules slurries dried onto a glass slide and further scratched while measuring the headspace with a photoionization detector.

The amounts of limonene released from the dry microcapsules are represented on FIG. 10. The data were normalized by the amount of limonene theoretically deposited on each glass slide. According to the FIG. 10, one can conclude that reinforcing the WPI microcapsules with HMP (high methoxy pectin) improves the barrier properties.

Example 7

Performance in a Flavored Product (Snack Applications)

A—Chicken Flavor

Microcapsules containing a chicken flavor were prepared using the same process as disclosed in example 1 with a ratio WPI/HMP=8 (~13.7 wt % oil in the microcapsules suspension). For comparison, an oil-in-water emulsion made of 7.9 g chicken flavor and 50 g gum Arabic 5 wt % solution was prepared using an ultra-turrax (13.6 wt % oil in the emulsion).

Then, 15 g of emulsion (for the Reference) or 15 g microcapsules suspension were coated onto 50 g of unflavored corn flakes using a rotating tumbler by spraying the suspension onto the corn flakes while rotating and drying by application of heat.

The obtained flavored corn flakes were then tasted by a group of 6 untrained panelists. A strong flavor intensity was perceived with the corn flakes coated with the microcapsules.

To measure the flavor release, chewing was mimicked in wet conditions and the volatiles released were measured by a photoionization detector.

Procedure:

1 g flavored corn flakes were transferred in a 30-ml glass bottle with 1 g deionized water.

The mixture was allowed to equilibrate for 15 minutes. Volatiles measurement in the headspace was measured for 30 seconds, then the measurement was pursued while kneading the wet corn flakes with a spatula for 1 minute.

One can observe that more flavor is released from the cornflakes coated with microcapsules, before as well as after the kneading.

B— Lemon Flavor

The same experiment was made with a lemon flavor instead of chicken flavor. 17 g of emulsion (for the Reference) or 17 g microcapsules suspension were coated onto 50 g of unflavored corn flakes using a rotating tumbler by spraying the suspension onto the corn flakes while rotating and drying by application of heat.

Chewing was mimicked by mixing 1 g corn flakes and 1 g deionized water. The volatiles released in the headspace were then measured by the photoionization detector before and after kneading as described above:

As for the chicken flavor, we observe a higher flavor release from the corn flakes coated with the microcapsules. This shows that microencapsulation enabled better volatiles retention during the coating process.

Example 8

Preparation of Microcapsules Cross-Linked with Glutaraldehyde 15 g limonene were sheared in 50 g of WPI 10 wt % solution using an ultra turrax. Then a solution containing 3 g $CaCl_2$ in 10 g DI water was added while stirring, followed by 31 g of HMP 2% solution.

The pH was adjusted to 5.29.

Figure 11:
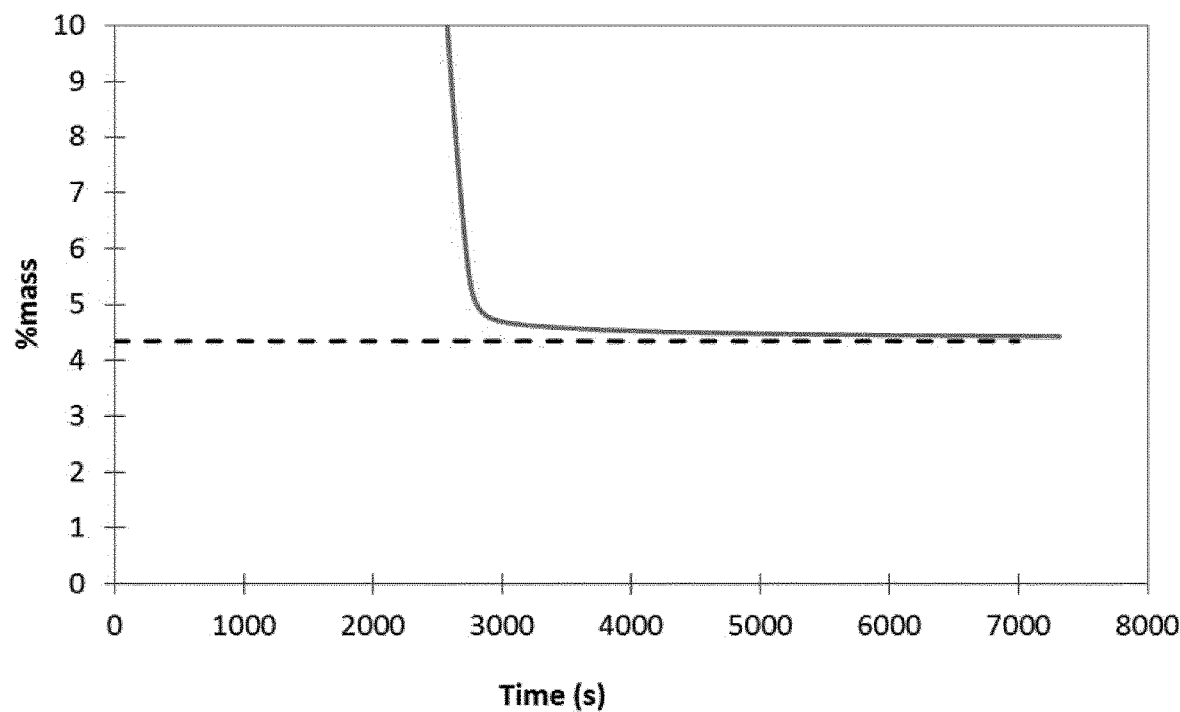
FIG. 11 is the thermogravimetric analysis at 50° C. of sample A diluted five-fold.

The emulsion was heated 1 hour at 85° C. while mechanically stirring. After cooling down, 0.10 g of glutaraldehyde 50% solution (Sigma) was added and the suspension was stirred 3 hours more at room temperature→microcapsules F are obtained TGA was performed at 50° C. on microcapsules F (sample diluted 5 times before TGA analysis). One can conclude from FIG. 11 that microcapsules F are stable according to TGA as shown by the curve lying above the dotted line (representing the theoretical dry content)

Example 9

Microcapsules Prepared by the Process of the Invention Cross-Linked with a Polyisocyanate Different amounts of diisocyanate (Takenate® D110-N-Trimethylol propane-adduct of xylylene diisocyanate, origin: Mitsui Chemicals, Inc., Japan—2.3% and 3.3% of trimethylol propane-adduct of xylylene diisocyanate) were added in 9 g perfume oil A (see table 2) before emulsification in 30 g of a 10 wt % WPI (whey protein isolate) solution, using the ultraturrax at 24000 rpm for 1 minute.

1.8 g of $CaCl_2$ dissolved in 6 g of deionized water were then added under magnetic stirring and the emulsion was allowed to stir for 10 minutes.

Then, 18.6 g of 2 wt % high methoxy pectin (HMP) solution were added to the emulsion under stirring, before adjusting the pH to ~8.6 (8.5-9) with dilute NaOH solution.

The obtained emulsion was then heated with an overhead mechanical stirrer in a water bath at 70° C. for 1 hour to induce the interfacial polymerisation.

After this first heating step, the pH was adjusted to 5.4 with dilute lactic acid and the slurry was heated at 85° C. for 1 hour more to induce the denaturation of the protein. Microcapsules G (2.3% of Takenate®) and H (3.3% of Takenate®) were obtained.

Thermogravimetric analysis was performed at 50° C. for 2 hours to evaluate the membrane barrier properties (TGA program: temperature ramp from 30 to 50° C. at a rate of 10° C./minute, followed by a 2 hour-isotherm at 50° C.).

All the samples were diluted 5-fold in deionized water before performing the analysis:

The dotted line represents the dry residue that should be remaining in the crucible at the end of the analysis if the microcapsules retain 100% perfume.

Figure 12:
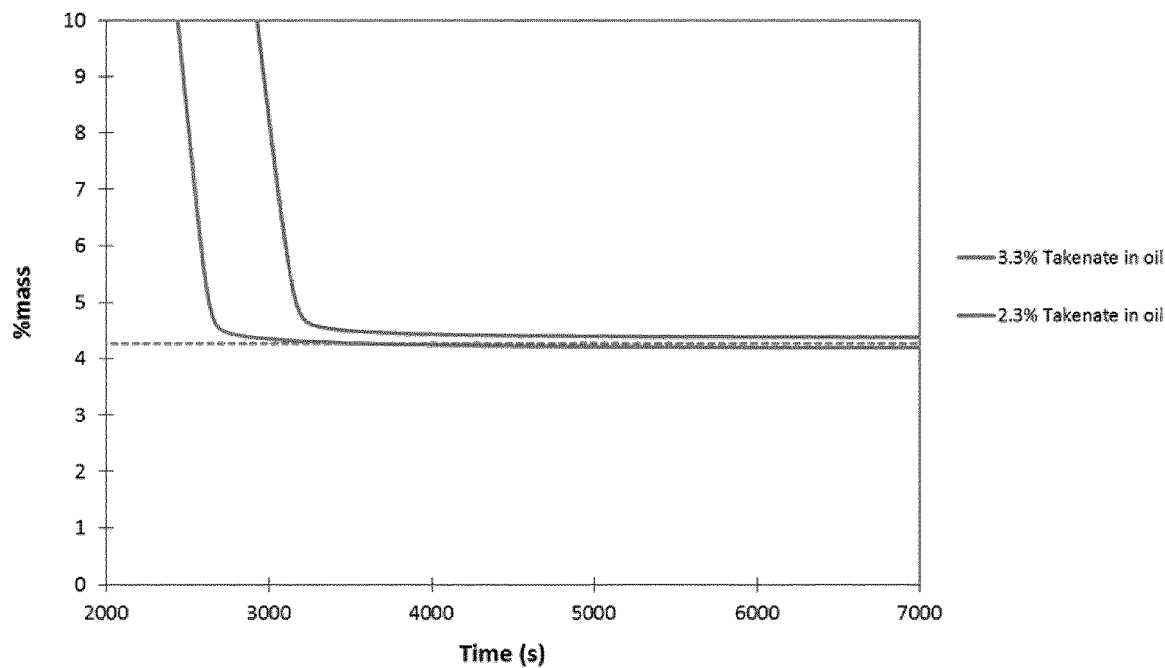
FIG. 12 is the thermogravimetric analysis at 50° C. of samples crosslinked with polyisocyanate.

One can conclude from FIG. 12 that both capsules G and H are stable.

Evaluation of the Stability of the Microcapsules in a Shower Gel Base:

A sufficient amount of microcapsule slurries G and H was weighed and mixed in the shower gel (Table 3) to add the equivalent of 0.2% perfume. The thus-obtained slurries were stored in closed vials at 38° C. and perfume leakage was measured after recorded periods of time by GC-MS.

TABLE 3

Composition of the shower gel

| Ingredients | Amount (% wt) |
| --- | --- |
| Deionised water | 49.35 |
| EDETA B Powder[1] | 0.05 |
| Carbopol ® Aqua SF-1 polymer[2] | 6.00 |
| Zetesol AO 328 U[3] | 35.00 |
| Sodium hydroxide 20% aqueous solution | 1.00 |
| Tego ® Betain F 50[4] | 8.00 |
| Kathon CG | 0.10 |
| Citric acid 40% aqueous solution | 0.50 |

Figure 13:
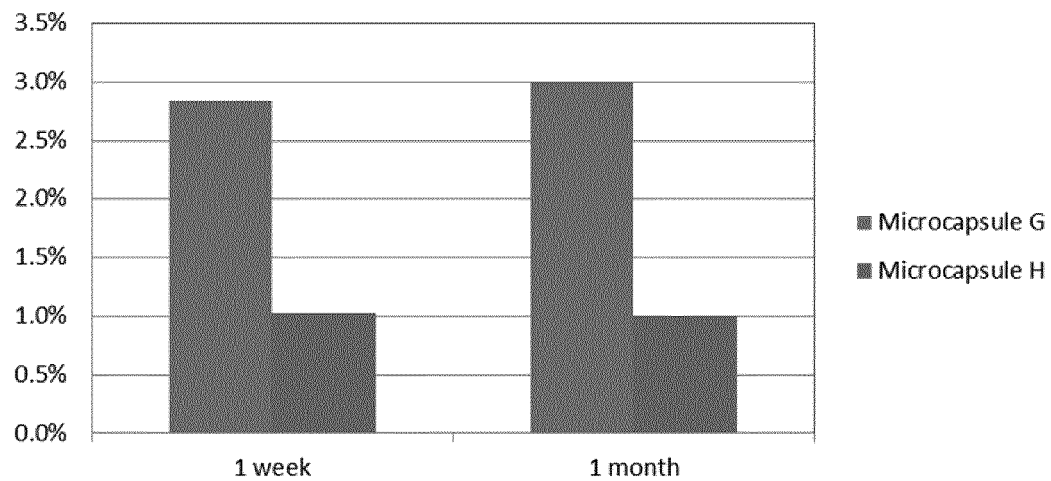
FIG. 13 represents the perfume leakage of microcapsules according to the invention in a shower gel base.

[1] Tetrasodium EDTA; origin: BASF
[2] Acrylates copolymer; origin: Noveon
[3] Sodium C12-C15 Pareth Sulfate; origin: Zschimmer & Schwarz
[4] Methylchloroisothiazolinone and methylisothiazolinone; origin: Rohm & Haas One can conclude from FIG. 13 that, after 1 month storage at 38° C. in the shower gel base, the microcapsules lost less than 3% of their perfume payload (see FIG. 13).

Example 10

Microcapsules Prepared by the Process of the Invention Cross-Linked with a Polyisocyanate Microcapsules I were prepared as follows.

An oil phase containing 0.0966 g Takenate dissolved in 4.6195 g of perfume oil B (see Table 4) was added into 15 g of a 10% WPI solution and sheared with an ultraturrax to form an O/W emulsion.

TABLE 4

Perfume oil B composition

| Raw mat | % in oil |
| --- | --- |
| Ethyl 2-methyl-pentanoate | 3.20% |
| Eucalyptol | 7.80% |
| 2,4-Dimethyl-3-cyclohexene-1-carbaldehyde [1] | 0.75% |
| Aldehyde C10 | 0.75% |
| Citronellyl Nitrile | 4.30% |
| Isobornyl acetate | 3.00% |
| Verdox ® [2] | 9.80% |

TABLE 4-continued

Perfume oil B composition

| Raw mat | % in oil |
|---|---|
| Citronellyl Acetate | 1.30% |
| 2-Methylundecanal | 3.00% |
| Diphenyloxide | 0.80% |
| Aldehyde C12 | 1.30% |
| Dicyclopentadiene acetate | 9.85% |
| Ionone beta | 3.30% |
| Undecalactone gamma | 18.75% |
| Hexyl Salicylate | 15.90% |
| Benzyl Salicylate | 16.20% |
| TOTAL | 100% |

[1] Origin: Firmenich SA, Swtizwerland
[2] 2-tert-butyl-1-cyclohexyl acetate, origin and trademark from IFF, USA Then, 0.92 g $CaCl_2$ dissolved in 2.5 g deionized water was added dropwise to the emulsion while stirring, followed by slow addition of 9.55 g HMP 2% solution (final pH of the obtained emulsion is 5.37).

A first cross-linking step was performed by stirring the emulsion at room temperature for 4 hours, to form an internal shell by interfacial polymerization.

In a second step, the protein layer was heat-aggregated by heating the slurry at 85° C. for 1 hour in a water bath.

In a last step, the external shell was cross-linked by glutaraldehyde as follows: the pH of the slurry was increased to pH 7.46 with dilute NaOH solution. Then 0.0874 g of a 50% glutaraldehyde solution was added and the slurry was allowed to stir for 1 night.

Figure 14:
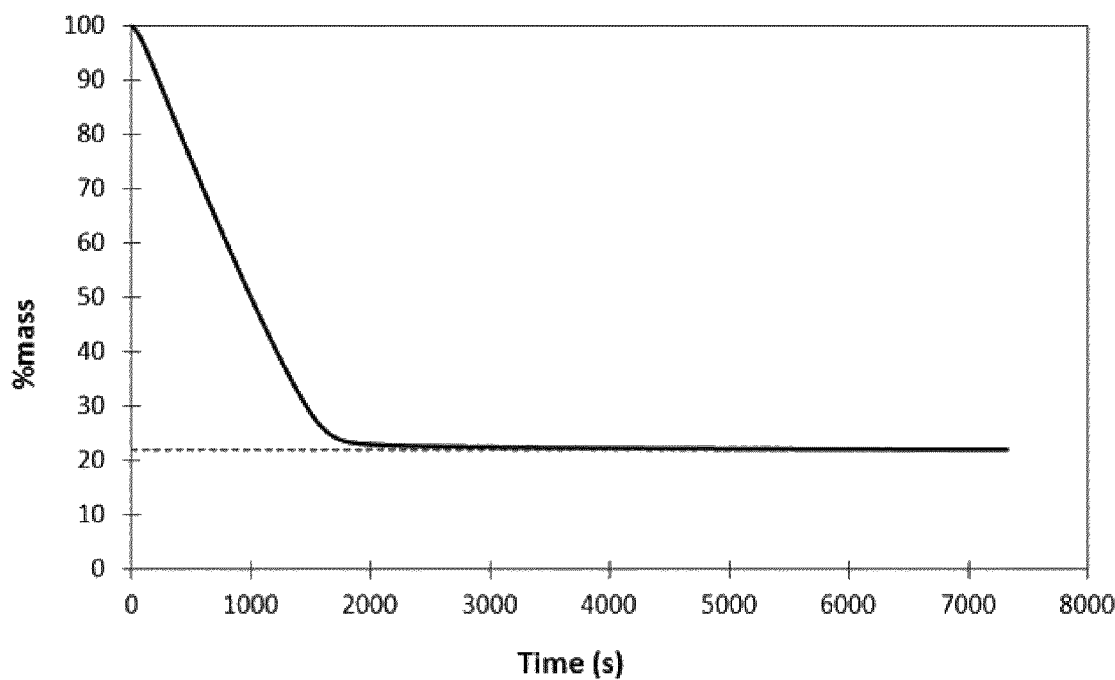
FIG. 14 is the thermogravimetric analysis at 50° C. of samples crosslinked with polyisocyanate and glutaraldehyde.

TGA analysis of the sample performed at 50° C. for 2 hours shows that the microcapsules obtained are thermally stable (see FIG. 14).

The stability of the microcapsules was also evaluated in a 5% SDS (sodium dodecyl sulfate) solution.

A few drops of the microcapsule slurry were added into 10 ml of SDS 5% solution and the microcapsules were observed through the microscope over time:

After 10 days in the SDS solution, the microcapsules remained spherical and release their oil upon pressure on the glass slide, which shows that they retained at least part of the encapsulated oil.

Example 11

Personal Care Compositions Comprising the Microcapsules of the Invention

Microcapsules I are introduced in different body care applications as follows:
10 g of suspension was centrifuged for 5 minutes to recover a concentrate microcapsules cake. The, 1 g of the concentrated microcapsules were incorporated in 10 g of 3 different unperfumed bases:
Base 1: Deodorant stick without alcohol
Base 2: Anti-perspirant stick with Al—Zr,
Base 3: Day cream
The formulas of the bases are given below.

TABLE 5

Base 1 composition: Deodorant stick without alcohol

| Ingredient | Amount (wt %) |
|---|---|
| Stearic acid (Part A) | 5.05 |
| 1,2-propylene glycol (Part A) | 41.87 |
| Sodium hydroxide 20% aqueous solution (Part A) | 4.24 |
| Water (Part A) | 30.30 |
| Tetrasodium EDTA[1] (Part A) | 0.10 |
| Ceteareth-25[2] (Part A) | 1.52 |
| PPG-3 Myristyl ether[3] (Part A) | 1.52 |
| 1,2-propylene glycol (Part B) | 15.14 |
| Triclosan[4] (Part B) | 0.25 |

[1] Edeta ® B Power; trademark and origin: BASF
[2] Cremophor ® A25; trademark and origin: BASF
[3] Tegosoft ® APM; trademark and origin: Evonik
[4] Irgasan ® DP 300; trademark and origin: BASF All the components of Part A are weighted (Table 5) and heated up to 70-75° C. Ceteareth-25 is added once the other Part A ingredients are mixed and heated. Once the Ceteareth-25 is dissolved, the Stearic Acid is added. Part B is prepared by dissolving the Triclosan in 1,2 Propylene Glycol. Water which has evaporated is added. Slowly under mixing, Part B is poured into part A. To stock, a plastic bag into the bucket is put in to be sealed after cooling. Moulds was filled at about 70° C.

TABLE 6

Base 2 composition (Anti-perspirant stick with Al—Zr)

| Ingredient | Amount (wt %) |
|---|---|
| Cyclomethicone[1] (Part A) | 55.56 |
| Stearyl Alcohol[2] (Part A) | 21.21 |
| PPG-14 Butyl ether[3] (Part A) | 2.02 |
| Hydrogenated Castor Oil[4] (Part A) | 1.01 |
| Aluminium Zirconium tetrachlorohydrex-Gly[5] (Part B) | 20.20 |

[1] Dow Corning ® 345 Fluid; trademark and origin: Dow Corning
[2] Lanette ® 18; trademark and origin: BASF
[3] Tegosoft ® PBE; trademark and origin: Evonik
[4] Cutina ® HR; trademark and origin: BASF
[5] Summit AZP-908; trademark and origin: Reheis All the components of Part A are weighted (Table 6), heated up to 70-75° C. and mixed well. Ingredient of Part B is dispersed in Part A. The mixture is mixed and putted into a tick at 65° C.

TABLE 7

Base 3 composition (Day cream)

| Ingredients | % |
|---|---|
| ARLATONE 985 | 5.000 |
| Ethoxylated Fatty Alcohol Ester | |
| CETYL ALCOHOL | 0.500 |
| TEFOSE 2561 | 4.000 |
| Ceteth-20 (and) Glyceryl Stearate (and) PEG-6 Stearate (and) Steareth-20 | |
| COSBIOL | 1.000 |
| Squalan | |
| MINERAL OIL 30-40 cp | 2.000 |
| Paraffin Oil | |
| PETROLEUM JELLY | 6.000 |
| Petrolatum | |
| WATER deionized | 75.850 |
| PROPYLENE GLYCOL | 5.000 |
| GLYDANT PLUS | 0.150 |
| DMDM Hydantoin (and) Iodopropynyl Butylcarbamate | |

TABLE 7-continued

Base 3 composition (Day cream)

| Ingredients | % |
|---|---|
| PNC 400 Sodium Carbomer | 0.200 |
| PERFUME | 0.300 |
| Total | 100.00 |

Example 12

Performance of Microcapsules in a Fabric Softener

Preparation of microcapsules J, K and L (cross-linked with a polyisocyanate) Different amounts of diisocyanate (Takenate® D110-N-Trimethylol propane-adduct of xylylene diisocyanate, origin: Mitsui Chemicals, Inc., Japan) were added in 30 g of perfume oil B (see Table 4) before emulsification in 50 g of a 10 wt % WPI (whey protein isolate) solution, using the ultraturrax at 24000 rpm for 1 minute.

3 g of $CaCl_2$ dissolved in 6 g of deionized water were then added under magnetic stirring and the emulsion was allowed to stir for 10 minutes.

Then, ca 31 g of 2 wt % high methoxy pectin (HMP) solution were added to the emulsion under stirring. The pH was kept at the natural value of the mixture, which is between 5 and 5.5.

The obtained emulsion was then stirred with an overhead mechanical stirrer at room temperature for 4 hours to induce the interfacial polymerisation.

After this first step, the slurry was heated at 85° C. for 1 hour to induce the denaturation of the protein.

Microcapsules J (2% of Takenate®), K (3% of Takenate®) and L (4% of Takenate®) were obtained.

Thermogravimetric Analysis

Thermogravimetric analysis was performed at 50° C. for 4 hours to evaluate the membrane barrier properties (TGA program: temperature ramp from 30 to 50° C. at a rate of 10° C./minute, followed by a 4 hour-isotherm at 50° C.). Results are displayed on FIG. 15.

The dotted line represents the dry residue that should be remaining in the crucible at the end of the analysis if the microcapsules retain 100% perfume.

Figure 15:
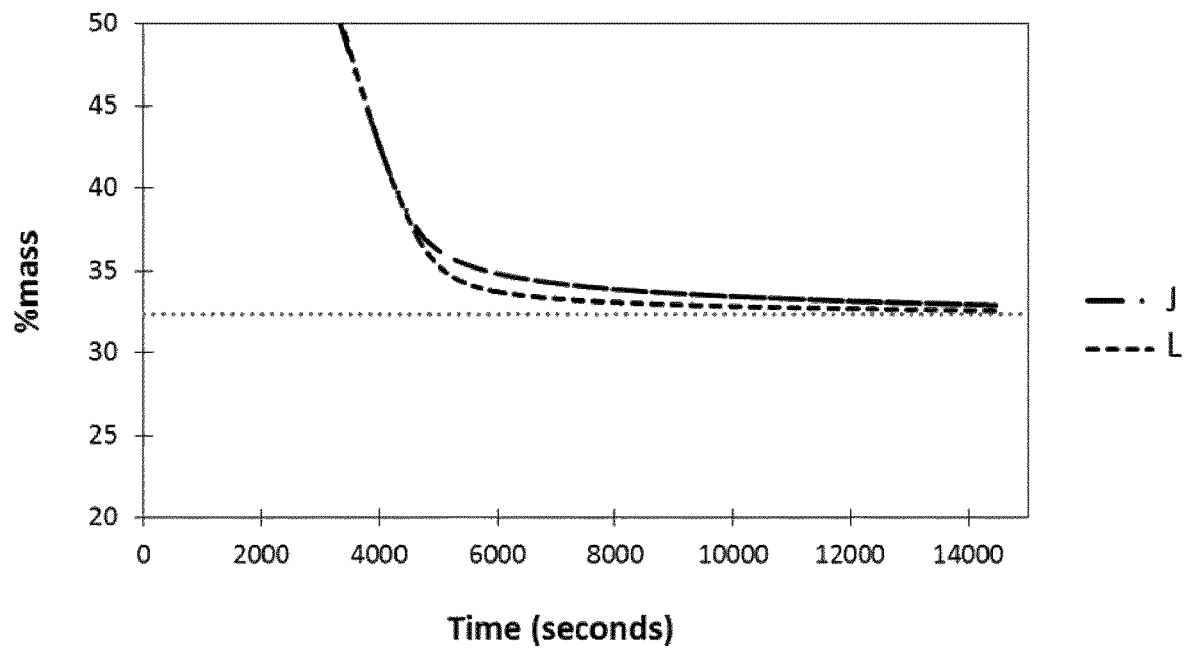
FIG. 15 is the thermogravimetric analysis at 50° C. of samples crosslinked with polyisocyanate.

One can conclude from FIG. 15 that capsules J and L are stable.

Perfume Leakage

A sufficient amount of capsules L was weighed and mixed in the softener base (see composition in table 8) to add the equivalent of 0.116% perfume. The slurry was stored in closed vials at 38° C. and perfume leakage was measured after recorded periods of time by GC-MS.

TABLE 8

Fabric softener composition

| Ingredients | Amount (% wt) | Function |
|---|---|---|
| Methyl bis[ethyl(tallowate)]-2-hydroxyethyl ammonium methyl sulfate[1] | 12.2 | Softening agent |
| Calcium chloride sol 10% | 0.4 | Viscosity modifier |
| 1,2-benzisothiazolin-3-one[2] | 0.04 | Preservative |
| Water | 87.36 | |

[1] Stepantex ® VL 90A- Stepan
[2] Proxel ® GXL-Arch

The softener is prepared by weighting Methyl bis[ethyl (tallowate)]-2-hydroxyethyl ammonium methyl sulfate which was heated at 65° C. Then, Water and 1,2-benzisothiazolin-3-one are placed in the reactor and are heated at 65° C. under stirring. To the above mixture is added Methyl bis[ethyl (tallowate)]-2-hydroxyethyl ammonium methyl sulfate. The mixture is stirred 15 minutes and $CaCl_2$ is added. Then microcapsules are added. The mixture is stirred 15 minutes and is cooled down to room temperature under stirring (viscosity measured:result 35+/−5 mPas. (shear rate 106 sec-1)).

Figure 16:
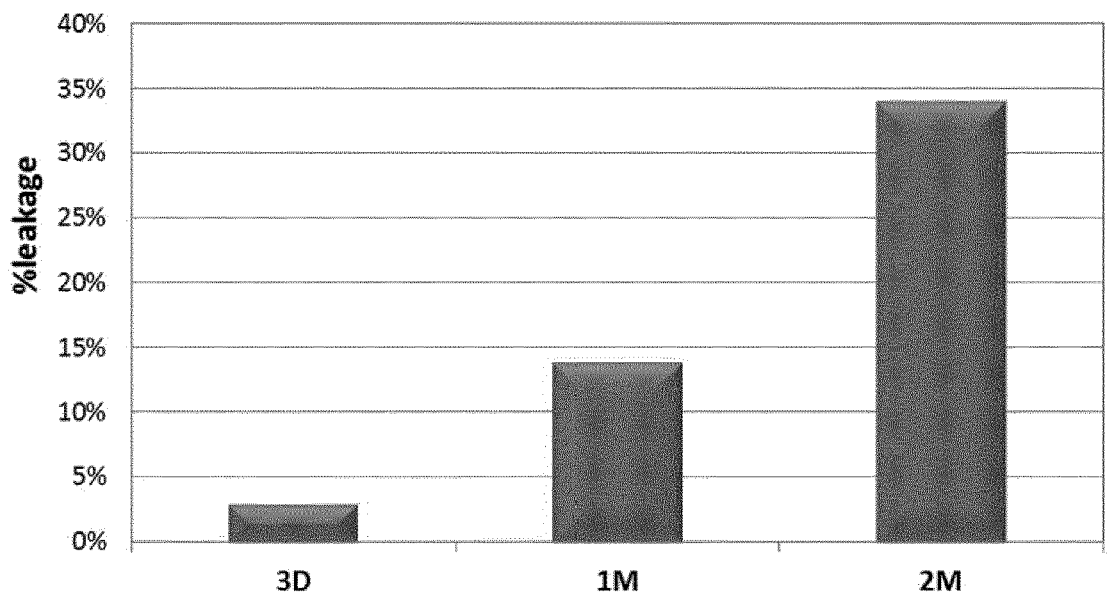
FIG. 16 represents the perfume leakage of microcapsules of the present invention in a fabric softener.

One can conclude from the results of FIG. 16 that the microcapsules are stable in a fabric softener at 38° C. after 2 months.

Evaluation of the Performance of Microcapsules in Softener Application:

Deposition and performance of microcapsules was evaluated on cotton towels according to the following washing protocol:

Washing machine program: 40° C.—short spinning—900 rpm

Towels: 24

The towels were then dried as follows:

Line drying (24 hrs)—ambient temperature and humidity. One set of towels per panelist.

Panelists were asked to blindly evaluate the perfume intensity of towels before and after rubbing on a linear scale between 1 (=no odour) and 7 (very strong odour).

The evaluation was performed on the freshly prepared microcapsule slurry/softener base mixtures, as well as on the mixtures stored 1 month at 37° C. (see table 9).

TABLE 9

Olfactive performance

| | FRESH | | After 1 month storage at 37° C. | |
|---|---|---|---|---|
| | Before rubbing | After rubbing | Before rubbing | After rubbing |
| Capsules A | 2.9 | 4.27 | 2.3 | 3.33 |
| Capsules B | 2.81 | 4.16 | 2.53 | 3.45 |
| Capsules C | 2.55 | 4.02 | 2.41 | 3.66 |

The rubbing effect was also measured, and is defined by the difference between the intensities before and after rubbing (δ)—see table 10.

TABLE 10

Olfactive performance

| | Capsules F | Capsules G | Capsules H |
|---|---|---|---|
| δ (fresh) | 1.37 | 1.36 | 1.47 |
| δ (1 month at 37° C.) | 1.03 | 0.92 | 1.25 |

One can conclude that microcapsules of the present invention provide an olfactive boost after rubbing.

Example 13

Spray-Dried Microcapsules Preparation

Emulsions A-E having the following ingredients are prepared.

TABLE 11

Composition of Emulsions A-E and composition of granulated powder A-E after spray-drying

| Ingredients | Emulsion A | Emulsion B | Emulsion C | Emulsion D | Emulsion E |
|---|---|---|---|---|---|
| Modified starch [1] | 2.6% | 2.6% | 2.6% | 12.5% | 2% |
| Maltodextrin [2] | 26.8% | 22.8% | 19.3% | 0% | 19.1% |
| Maltose [3] | 0% | 0% | 0% | 7.9% | 0% |
| Citric Acid | 0% | 0% | 0% | 1% | 0% |
| Tripotassium Citrate | 0% | 0% | 0% | 1.9% | 0% |
| Microcapsules I-L | 12.0% | 24% | 37.0% | 8.9% | 56.2% |
| Silica [4] | 1.1% | 1.1% | 1.1% | 0% | 0% |
| Free Perfume C [5] | 0% | 0% | 0% | 11% | 0% |
| Water | 57.6% | 49.6% | 40.1% | 56.9% | 22.7% |

| | Granule A | Granule B | Granule C | Granule D | Granule E |
|---|---|---|---|---|---|
| Modified starch [1] | 7.5% | 7.4% | 7.2% | 31.6% | 4.9% |
| Maltodextrin [2] | 77.4% | 65.5% | 53.8% | 0% | 44.7% |
| Maltose | 0% | 0% | 0% | 20.9% | 0% |
| Citric Acid | 0% | 0% | 0% | 2.6% | 0% |
| Tripotassium citrate | 0% | 0% | 0% | 4.9% | 0% |
| Encapsulated perfume C | 0% | 0% | 0% | 28.1% | 0% |
| Microcapsules I-L | 12.% | 24.1% | 36.1% | 9.8% | 48.4% |
| Silica | 3.0 | 3.0% | 2.9% | 2.0% | 2% |
| Fragrance loading in powder after spray-drying | 10.1% | 20.1% | 30% | 35.8% | 40.2% |

[1] Capsul™, Ingredion
[2] Maltodextrin 10DE origin: Roquette
[3] Maltose, Lehmann & Voss
[4] Silica, Evonik
[5] see table 12

TABLE 12

Composition of Perfume C

| Component | % |
|---|---|
| ACÉTATE DE 4-(1,1-DIMÉTHYLÉTHYL)-1-CYCLOHEXYLE [1] | 14.50 |
| LINALOL BJ | 10.50 |
| LILIAL ® [2] | 10.00 |
| ISO E SUPER [3] | 10.00 |
| CITRONELLYL NITRILE | 9.00 |
| DIPHENYLOXYDE | 6.50 |
| ISOBORNYL ACETATE | 6.00 |
| BETA IONONE | 6.00 |
| TRICYCLO[5.2.1.0~2,6~]ACETATE (A) + TRICYCLO[5.2.1.0~2,6~]ACETATE (B) [4] | 5.50 |
| ETHER MT | 4.00 |
| HEDIONE ® [5] | 4.00 |
| GERANIOL 60 | 3.00 |
| CITRAL | 2.50 |
| ALDEHYDE C 10 | 2.50 |
| ALLYL HEPTANOATE | 2.50 |
| ETHYL METHYL-2-BUTYRATE | 1.50 |
| GERANYL ACETATE | 1.00 |
| 2,4-DIMETHYL-3-CYCLOHEXENE-1-CARBALDEHYDE [6] | 1.00 |

[1] Firmenich SA, Switzerland
[2] 3-(4-tert-butylphenyl)-2-methylpropanal, Givaudan SA, Vernier, Switzerland
[3] 1-(octahydro-2,3,8,8-tetramethyl-2-naphtalenyl)-1-ethanone, International Flavors & Fragrances, USA
[4] Firmenich SA, Switzerland
[5] Methyl dihydrojasmonate, Firmenich SA, Switzerland
[6] Firmenich SA, Switzerland Components for the polymeric matrix (Maltodextrin and Capsul™, or CAPSUL™, Citric Acid and tripotassium citrate) are added in water at 45-50° C. until complete dissolution. For emulsion D, free perfume C is added to the aqueous phase.

Microcapsules slurry is added to the obtained mixture. Then, the resulting mixture is then mixed gently at 25° C. (room temperature).

Granulated powder A-E are prepared by spray-drying Emulsion A-E using a Sodeva Spray Dryer (Origin France), with an air inlet temperature set to 215° C. and a throughput set to 500 ml per hour. The air outlet temperature is of 105° C. The emulsion before atomization is at ambient temperature.

Example 14

Liquid Scent Booster Composition

A sufficient amount of microcapsule slurry G, H, I, J, K or L is weighed and mixed in a liquid scent booster (Table 13) to add the equivalent of 0.2% perfume.

TABLE 13

Liquid scent booster composition

| Ingredients | Amount (% wt) | | | | | |
|---|---|---|---|---|---|---|
| | 1 | 2 | 3 | 4 | 5 | 6 |
| Water | 71.20% | 89.5% | 78.8% | 79.4% | 70% | 70% |
| Propylene glycol | 20.30% | — | — | — | 20% | 20% |
| Polyethylene glycol ethers of decyl alcohol[1] | 4.00% | 6% | | | | |
| Polyethylene glycol ether of Lauryl Alcohol[2] | | | | | 4.00% | 4.00% |
| alkyl polyglucoside C8-C10[3] | | | 8.30% | 7.7% | | |
| Deceth-3[1] | 1.50% | | | | | |
| Lauryl lactate | | | | 1% | | |
| Lauric acid | | 1.5% | 1.60% | | | |
| Glyceryl Caprylate | | | | | 3.00% | 3.00% |
| Fragrance | 3.00% | 3.0% | 3.00% | 3.00% | 3.00% | 0% |

[1] Deceth-8; trademark and origin: KLK Oleo
[2] Laureth-9;; trademark and origin
[3] Plantacare 2000UP; trademark and origin: BASF Different ringing gel compositions are prepared (compositions 1-6) according to the following protocol.

In a first step, the aqueous phase (water), the solvent (propylene glycol) if present and surfactants are mixed together at room temperature under agitation with magnetic stirrer at 300 rpm for 5 min.

In a second step, the linker is dissolved in the hydrophobic active ingredient (fragrance) at room temperature under agitation with magnetic stirrer at 300 rpm. The resulting mixture is mixed for 5 min.

Then, the aqueous phase and the oil phase are mixed together at room temperature for 5 min leading to the formation of a transparent or opalescent ringing gel.

Example 15

Liquid Detergent Composition

A sufficient amount of microcapsule slurry G, H, I, J, K or L is weighed and mixed in a liquid detergent (Table 14) to add the equivalent of 0.2% perfume.

TABLE 14

Liquid detergent composition

| Ingredients | Concentration [wt %] |
|---|---|
| Sodium $C_{14-17}$ Alkyl Sec Sulfonate[1] | 7 |
| Fatty acids, $C_{12-18}$ and C18-unsaturated[2] | 7.5 |
| $C_{12/14}$ fatty alcohol polyglycol ether with 7 mol EO[3] | 17 |
| Triethanolamine | 7.5 |
| Propylene Glycol | 11 |
| Citric acid | 6.5 |
| Potassium Hydroxide | 9.5 |
| Properase L[4] | 0.2 |
| Puradax EG L[4] | 0.2 |
| Purastar ST L[4] | 0.2 |
| Acrylates/Steareth-20 Methacrylate structuring Crosspolymer[5] | 6 |
| Deionized Water | 27.4 |

[1] Hostapur SAS 60; Origin: Clariant
[2] Edenor K 12-18; Origin: Cognis
[3] Genapol LA 070; Origin: Clariant
[4] Origin: Genencor International
[5] Aculyn 88; Origin: Dow Chemical

Example 16

Powder Detergent Composition

A sufficient amount of granules A-E is weighed and mixed in a powder detergent composition (Table 15) to add the equivalent of 0.2% perfume.

TABLE 15

Powder detergent composition

| Ingredients | Part |
|---|---|
| Anionic (Linear Alkyl Benzene Sulphonates) | 20% |
| Nonionics (Alcohol Ethoxylates) (5-9 ethylene oxide) | 6% |
| Builders (zeolites, sodium carbonate) | 25% |
| Silicates | 6% |
| Sodium Sulphate | 35% |
| Others (Enzymes, Polymers, Bleach) | 7.5% |
| Spray-dried granule powder A-E | 0.5% |

Example 17

Concentrated all Purpose Cleaner Composition

A sufficient amount of microcapsule slurry G, H, I, J, K or L is weighed and mixed in a concentrated all-purpose cleaner composition (Table 16) to add the equivalent of 0.2% perfume.

TABLE 16 concentrated all-purpose cleaner composition

| Ingredients | Amount (% wt) | Function |
|---|---|---|
| Ethoxylated Alcohol (C9-C11, 8EO) [1] | 20 | Non-ionic surfactant |
| Sodium Dodecyl Benzene Sulfonate [2] | 16 | Anionic surfactant |
| Sodium Cumene Sulfonate [3] | 8 | Hydrotrope |
| Methyl chloro isothiazolinone Methyl isothiazolinone 3.3:1 [4] | 0.8% | preservative |
| Water | 55.9 | solvent |

[1] Neodol 91-8 ®; trademark and origin: Shell Chemical
[2] Biosoft D-400 ®; trademark and origin: Stepan Company
[3] Stepanate SCS ®; trademark and origin: Stepan Company
[4] Kathon CG ®; trademark and origin: Dow Chemical Company All ingredients are mixed together and then the mixture was diluted with water to 100%.

Example 18

Solid Scent Booster Composition

The following compositions are prepared.

TABLE 17

Salt-based solid scent booster compositions

| Ingredients | Part |
|---|---|
| Sodium chloride | 95 |
| Spray-dried granule powder A-E | 5 |

TABLE 18

Urea-based solid scent booster compositions

| Ingredients | Part |
|---|---|
| Urea (beads) | 94 |
| Spray-dried granule powder A-E | 8 |
| Bentonite | 3 |
| Perfume | 3 |

Example 19

Shampoo Composition

A sufficient amount of microcapsule slurry G, H, I, J, K or L is weighed and mixed in a shampoo composition (Table 19) to add the equivalent of 0.2% perfume.

TABLE 19

Shampoo composition

| | Ingredients | Concentration [wt %] |
|---|---|---|
| A | Water deionized | 44.4 |
| | Polyquaternium-10 [1] | 0.3 |
| | Glycerin 85% [2] | 1 |
| | DMDM Hydantoin [3] | 0.2 |
| B | Sodium Laureth Sulfate [4] | 28 |
| | Cocamidopropyl Betaine [5] | 3.2 |
| | Disodium Cocoamphodiacetate [6] | 4 |
| | Ethoxy (20) Stearyl Alcohol [6] | 1 |
| C | Sodium Laureth Sulfate [4] | 3 |
| | Glyceryl Laureate [7] | 0.2 |
| D | Water deionized | 1 |
| | Sodium Methylparaben [8] | 0.1 |
| E | Sodium Chloride 10% aqueous sol. | 15 |
| | Citric acid 10% aqueous sol. till pH 5.5-6 | q.s. |
| | Perfume | 0.5 |
| | TOTAL: | 100 |

[1] Ucare Polymer JR-400, Noveon
[2] Schweizerhall
[3] Glydant, Lonza
[4] Texapon NSO IS, Cognis
[5] Tego Betain F 50, Evonik
[6] Amphotensid GB 2009, Zschimmer & Schwarz
[7] Monomuls 90 L-12, Gruenau
[8] Nipagin Monosodium, NIPA Polyquaternium-10 is dispersed in water. The remaining ingredients of phase A are mixed separately by addition of one after the other while mixing well after each adjunction. Then this pre-mix is added to the Polyquaternium-10 dispersion and was mixed for 5 min. Then Phase B and the premixed Phase C (heat to melt Monomuls 90 L-12 in Texapon NSO IS) are added. The mixture is mixed well. Then, Phase D and Phase E are added while agitating. The pH was adjusted with citric acid solution till pH: 5.5-6.0.

Example 20

Shampoo Composition

A sufficient amount of microcapsule slurry G, H, I, J, K or L is weighed and mixed in a shampoo composition (Table 20) to add the equivalent of 0.2% perfume.

TABLE 20

Shampoo composition

| | Ingredients | Concentration [wt %] |
|---|---|---|
| A | Water deionized | 45.97 |
| | Tetrasodium EDTA [1] | 0.05 |
| | Guar Hydroxypropyltrimonium Chloride [2] | 0.05 |
| | Polyquaternium-10 [3] | 0.075 |
| B | NaOH 10% aqueous sol. | 0.3 |
| C | Ammonium Lauryl Sulfate [4] | 34 |
| | Ammonium Laureth Sulfate [5] | 9.25 |
| | Cocamidopropyl Betaine [6] | 2 |
| | Dimethicone (&) C12-13 Pareth-4 (&) C12-13 Pareth-23 (&) Salicylic Acid [7] | 2.5 |
| D | Cetyl Alcohol [8] | 1.2 |
| | Cocamide MEA [9] | 1.5 |
| | Glycol Distearate [10] | 2 |

TABLE 20-continued

Shampoo composition

| | Ingredients | Concentration [wt %] |
|---|---|---|
| E | Methylchloroisothiazolinone & Methylisothiazolinone [11] | 0.1 |
| | D-Panthenol 75% [12] | 0.1 |
| | Water deionized | 0.3 |
| F | Sodium Chloride 25% aqueous sol. | 0.6 |
| | TOTAL: | 100 |

[1] EDETA B Powder, BASF
[2] Jaguar C14 S, Rhodia
[3] Ucare Polymer JR-400, Noveon
[4] Sulfetal LA B-E, Zschimmer & Schwarz
[5] Zetesol LA, Zschimmer & Schwarz
[6] Tego Betain F 50, Evonik
[7] Xiameter MEM-1691, Dow Corning
[8] Lanette 16, BASF
[9] Comperlan 100, Cognis
[10] Cutina AGS, Cognis
[11] Kathon CG, Rohm & Haas
[12] D-Panthenol, Roche A premix comprising Guar Hydroxypropyltrimonium Chloride and Polyquaternium-10 are added to water and Tetrasodium EDTA while mixing. When the mixture is homogeneous, NaOH is added. Then, Phase C ingredients are added and the mixture was heat to 75° C. Phase D ingredients are added and mixed till homogeneous. The heating is stopped and temperature of the mixture is decreased to RT. At 45° C., ingredients of Phase E while mixing final viscosity is adjusted with 25% NaCl solution and pH of 5.5-6 is adjusted with 10% NaOH solution.

Example 21

Rinse-Off Hair Composition

A sufficient amount of microcapsule slurry G, H, I, J, K or L is weighed and mixed in a rinse-off composition (Table 21) to add the equivalent of 0.2% perfume.

TABLE 21 rinse-off composition

| | Ingredients | Concentration [wt %] |
|---|---|---|
| A | Water deionized | 81.8 |
| | Behentrimonium Chloride [1] | 2.5 |
| | Hydroxyethylcellulose [2] | 1.5 |
| B | Cetearyl Alcohol [3] | 4 |
| | Glyceryl Stearate (and) PEG-100 Stearate [4] | 2 |
| | Behentrimonium Methosulfate (and) Cetyl alcohol (and) Butylene Glycol [5] | 4 |
| | Ethoxy (20) Stearyl Alcohol [6] | 1 |
| C | Amodimethicone (and) Trideceth-12 (and) Cetrimonium Chloride [7] | 3 |
| | Chlorhexidine Digluconate [8] 20% aqueous solution | 0.2 |

TABLE 21-continued rinse-off composition

| | Ingredients | Concentration [wt %] |
|---|---|---|
| D | Citric acid 10% aqueous sol. till pH 3.5-4 | q.s. |
| | TOTAL: | 100 |

[1] Genamin KDMP, Clariant
[2] Tylose H10 Y G4, Shin Etsu
[3] Lanette O, BASF
[4] Arlacel 165, Croda
[5] Incroquat Behenyl TMS-50-PA-(MH), Croda
[6] Brij S20, Croda
[7] Xiameter MEM-949, Dow Corning
[8] Alfa Aesar Ingredients of Phase A are mixed until an uniform mixture was obtained. Tylose is allowed to completely dissolve. Then the mixture is heated up to 70-75° C. Ingredients of Phase B are combined and melted at 70-75° C. Then ingredients of Phase B are added to Phase A with good agitation and the mixing is continued until cooled down to 60° C. Then, ingredients of Phase C are added while agitating and keeping mixing until the mixture cooled down to 40° C. The pH is adjusted with citric acid solution till pH: 3.5-4.0.

Example 22

Antiperspirant Spray Anhydrous Composition

A sufficient amount of microcapsule slurry G, H, I, J, K or L is weighed and mixed in an antiperspirant spray anhydrous composition (Table 22) to add the equivalent of 0.2% perfume.

TABLE 22 antiperspirant spray anhydrous composition

| Ingredient | Amount (wt %) |
|---|---|
| Cyclomethicone[1] | 53.51 |
| Isopropyl miristate | 9.04 |
| Silica[2] | 1.03 |
| Quaternium-18-Hectorite[3] | 3.36 |
| Aluminium Chlorohydrate[4] | 33.06 |

[1] Dow Corning ® 345 Fluid; trademark and origin: Dow Corning
[2] Aerosil ® 200; trademark and origin: Evonik
[3] Bentone ® 38; trademark and origin: Elementis Specialities
[4] Micro Dry Ultrafine; origin: Reheis Using a high speed stirrer, Silica and Quaternium-18-Hectorite are added to the Isopropyl miristate and Cyclomethicone mixture. Once completely swollen, Aluminium Chlorohydrate is added portion wise under stirring until the mixture was homogeneous and without lumps. The aerosol cans are filled with 25% Suspension of the suspension and 75% of Propane/Butane (2.5 bar).

Example 23

Antiperspirant Spray Emulsion Composition

A sufficient amount of microcapsule slurry G, H, I, J, K or L is weighed and mixed in antiperspirant spray emulsion composition (Table 23) to add the equivalent of 0.2% perfume.

TABLE 23 antiperspirant spray emulsion composition

| Ingredient | Amount (wt %) |
|---|---|
| Polysorbate 65[1] (Part A) | 0.95 |
| Polyglyceryl-2 dipolyhydroxystearate[2] (Part A) | 1.05 |
| Cetyl PEG/PPG-10/1 Dimethicone[3] (Part A) | 2.75 |
| Cyclomethicone[4] (Part A) | 16.4 |
| Isopropylisostearate[5] (Part A) | 4.5 |
| Phenoxyethanol[6] (Part A) | 0.5 |
| Ethylhexylglycerin[7] (Part A) | 0.2 |
| C12-15 Alkyl Benzoate[8] (Part A) | 5.65 |
| Silica Silylate[9] (Part A) | 0.1 |
| Sodium Methylparaben[10] (Part B) | 0.1 |
| Aluminium Chlorohydrate[11] (Part B) | 20 |
| Water (Part B) | 44.47 |
| Fragrance (Part C) | 3.33 |

[1] Tween 65; trademark and origin: CRODA
[2] Dehymuls PGPH; trademark and origin: BASF
[3] Abil EM-90; trademark and origin: BASF
[4] Dow Corning 345 fluid; trademark and origin: Dow Corning
[5] Crodamol ipis; trademark and origin: CRODA
[6] Phenoxyethanol; trademark and origin: LANXESS
[7] Sensiva sc 50; trademark and origin: KRAFT
[8] Tegosoft TN; trademark and origin: Evonik
[9] Aerosil R 812; trademark and origin: Evonik
[10] Nipagin mna; trademark and origin: CLARIANT
[11] Locron L; trademark and origin: CLARIANT The ingredients of Part A and Part B are weighted separately. Ingredients of Part A are heated up to 60° C. and ingredients of Part B are heated to 55° C. Ingredients of Part B are poured small parts while continuous stirring into A. Mixture were stirred well until the room temperature was reached. Then, ingredients of part C are added. The emulsion is mixed and is introduced into the aerosol cans. The propellant is crimped and added.
Aerosol filling: 30% Emulsion: 70% Propane/Butane 2.5 bar

Example 24

Deodorant Spray Composition

A sufficient amount of microcapsule slurry G, H, I, J, K or L is weighed and mixed in antiperspirant deodorant spray composition (Table 24) to add the equivalent of 0.2% perfume.

TABLE 24 deodorant spray composition

| Ingredient | Amount (wt %) |
|---|---|
| Ethanol 95% | 90.65 |
| Triclosan[1] | 0.26 |
| Isopropyl miristate | 9.09 |

[1] Irgasan ® DP 300; trademark and origin: BASF

All the ingredients according to the sequence of the Table 24 are mixed and dissolved. Then the aerosol cans are filled, crimp and the propellant is added (Aerosol filling: 40% active solution 60% Propane/Butane 2.5 bar).

Example 25

Antiperspirant Roll-On Emulsion Composition

A sufficient amount of microcapsule slurry G, H, I, J, K or L is weighed and mixed in antiperspirant roll-on emulsion composition (Table 25) to add the equivalent of 0.2% perfume.

TABLE 25 antiperspirant roll-on emulsion composition

| Ingredient | Amount (wt %) |
|---|---|
| Steareth-2[1] (Part A) | 3.25 |
| Steareth-21[2] (Part A) | 0.75 |
| PPG-15 Stearyl Ether[3] (Part A) | 4 |
| WATER deionised (Part B) | 51 |
| Aluminum Chlorohydrate 50% aqueous solution[4] (Part C) | 40 |
| Fragrance (Part D) | 1 |

[1] BRIJ 72; origin: ICI
[2] BRIJ 721; origin: ICI
[3] ARLAMOL E; origin: UNIQEMA-CRODA
[4] LOCRON L; origin: CLARIAN Part A and B are heated separately to 75° C.; Part A is added to part B under stirring and the mixture is homogenized for 10 minutes. Then, the mixture is cooled down under stirring; and part C is slowly added when the mixture reached 45° C. and part D when the mixture reached at 35° C. while stirring. Then the mixture is cooled down to RT.

Example 26

Antiperspirant Roll-On Composition

A sufficient amount of microcapsule slurry G, H, I, J, K or L is weighed and mixed in antiperspirant roll-on composition (Table 26) to add the equivalent of 0.2% perfume.

TABLE 26 antiperspirant roll-on composition

| Ingredient | QUANTITY |
|---|---|
| Water (Part A) | 45 |
| Aluminum Chlorohydrate 50% aqueous solution[1] (Part B) | 20 |
| Alcohol Denat. (Ethanol 96%) (Part B) | 30 |
| Ceteareth-12[2] (Part C) | 2 |
| Ceteareth-30[3] (Part C) | 2 |
| Fragrance (Part D) | 1 |

[1] LOCRON L; origin: CLARIANT
[2] EUMULGIN B-1; origin: BASF
[3] EUMULGIN B-3; origin: BASF The ingredients of part B are mixed in the vessel then ingredient of part A is added. Then dissolved part C in part A and B. With perfume, 1 part of Cremophor RH40 for 1 part of perfume is added while mixing well

Example 27

Antiperspirant Roll-On Composition

A sufficient amount of microcapsule slurry G, H, I, J, K or L is weighed and mixed in antiperspirant roll-on emulsion composition (Table 27) to add the equivalent of 0.2% perfume.

TABLE 27 antiperspirant roll-on emulsion composition

| Ingredient | Amount (wt %) |
|---|---|
| Water (Part A) | 50.51 |
| Hydroxyethylcellulose[1] (Part A) | 0.71 |
| Ethanol 95% (Part B) | 40.40 |
| 1,2-Propylene Glycol (Part B) | 5.05 |

TABLE 27-continued antiperspirant roll-on emulsion composition

| Ingredient | Amount (wt %) |
|---|---|
| Triclosan[2] (Part B) | 0.30 |
| PEG-40 Hydrogenated castor oil[3] (Part C) | 3.03 |

[1]Natrosol ® 250 H; trademark and origin: Ashland
[2]Irgasan ® DP 300; trademark and origin: BASF
[3]Cremophor ® RH 40; trademark and origin: BASF Part A is prepared by sprinkling little by little the Hydroxyethylcellulose in the water whilst rapidly stirring with the turbine. Stirring is continued until the Hydroxyethylcellulose is entirely swollen and giving a limpid gel. Then, Part B is poured little by little in Part A whilst continuing stirring until the whole is homogeneous. Part C is added.

Example 28

Deodorant Pump Without Alcohol Formulation

A sufficient amount of microcapsule slurry G, H, I, J, K or L is weighed and mixed in the following composition (Table 28) to add the equivalent of 0.2% perfume.

TABLE 28 deodorant composition

| Ingredients | Amount (wt %) |
|---|---|
| C12-15 Alkyl Lactate[1] | 5 |
| Dimethicone[2] | 91.6 |
| Cetyl Lactate[3] | 1 |
| Octyldodecanol[4] | 0.8 |
| Triclosan[5] | 0.1 |
| PERFUME | 1.5 |

[1]Ceraphyl 41; trademark and origin ASHLAND
[2]DOW CORNING 200 FLUID 0.65 cs; trademark and origin DOW CORNING CORPORATION
[3]Ceraphyl 28; trademark and origin ASHLAND
[4]Eutanol G; trademark and origin BASF
[5]Irgasan ® DP 300; trademark and origin: BASF All the ingredients of Table 28 are mixed according to the sequence of the table and the mixture is heated slightly to dissolve the Cetyl Lactate.

Example 29

Deodorant Pump with Alcohol Formulation

A sufficient amount of microcapsule slurry G, H, I, J, K or L is weighed and mixed in the following composition (Table 29) to add the equivalent of 0.2% perfume.

TABLE 29 deodorant composition

| Ingredients | Amount (wt %) |
|---|---|
| Ethyl Alcohol (Part A) | 60 |
| PEG-6 Caprylic/Capric Glycerides[1] (Part A) | 2 |
| Water (Part A) | 35.6 |
| PEG-40 Hydrogenated Castor Oil[2] (Part B) | 0.4 |
| PERFUME (Part B) | 2 |

[1]Softigen 767; trademark and origin CRODA
[2]Cremophor ® RH 40; trademark and origin: BASF Ingredients from Part B are mixed together. Ingredients of Part A are dissolved according to the sequence of the Table and are poured into part B.

Example 30

Talc Formulation

A sufficient amount of granules A-E is weighed and mixed in introduced in a standard talc base: 100% talc, very slight characteristic odor, white powder, origin: LUZENAC to add the equivalent of 0.2% perfume.

Example 31

Shower-Gel Reference

A sufficient amount of microcapsule slurry G, H, I, J, K or L is weighed and mixed in the following composition (Table 30) to add the equivalent of 0.2% perfume.

TABLE 30 shower gel composition

| Ingredients | Amount (% wt) | Function |
|---|---|---|
| WATER deionised | 49.350 | Solvent |
| Tetrasodium EDTA [1] | 0.050 | Chelating agent |
| Acrylates Copolymer[2] | 6.000 | Thickener |
| Sodium C12-C15 Pareth Sulfate [3] | 35.000 | Surfactant |
| Sodium Hydroxide 20% aqueous solution | 1.000 | pH adjuster |
| Cocamidopropyl Betaine[4] | 8.000 | Surfactant |
| Methylchloroisothiazolinone and Methylisothiazolinone[5] | 0.100 | Preservative |
| Citric Acid (40%) | 0.500 | pH adjuster |

[3] EDETA B POWDER; trademark and origin: BASF
[4]CARBOPOL AQUA SF-1 POLYMER; trademark and origin: NOVEON
[5]ZETESOL AO 328 U; trademark and origin: ZSCHIMMER & SCHWARZ
[6]TEGO-BETAIN F 50; trademark and origin: GOLDSCHMIDT
[7]KATHON CG; trademark and origin: ROHM & HASS Ingredients are mixed, pH is adjusted to 6-6.3 (Viscosity: 4500cPo+/−1500cPo (Brookfield RV/Spindle #4/20 RPM)).

Example 32

Shower-Gel Composition

A sufficient amount of microcapsule slurry G, H, I, J, K or L is weighed and mixed in the following composition (Table 31) to add the equivalent of 0.2% perfume.

TABLE 31 shower gel composition

| Ingredients | Amount (% wt) | Function |
|---|---|---|
| WATER deionized | 52.40 | Solvent |
| Tetrasodium EDTA [1] | 0.10 | Chelating agent |
| Sodium Benzoate | 0.50 | Preservative |
| Propylene Glycol | 2.00 | Solvent |
| Sodium C12-C15 Pareth Sulfate [2] | 35.00 | Surfactant |
| Cocamidopropyl Betaine[3] | 8.00 | Surfactant |

TABLE 31-continued shower gel composition

| Ingredients | Amount (% wt) | Function |
|---|---|---|
| Polyquaternium-7[4] | 0.20 | Conditioning agent |
| Citric Acid (40%) | 1.00 | pH adjuster |
| Sodium Chloride | 0.80 | Viscosity adjuster |

[1] EDETA B POWDER; trademark and origin: BASF
[2] ZETESOL AO 328 U; trademark and origin: ZSCHIMMER & SCHWARZ
[3] TEGO-BETAIN F 50; trademark and origin: GOLDSCHMIDT
[4] MERQUAT 550; trademark and origin: LUBRIZOL Ingredients are mixed, pH is adjusted to 4.5 (Viscosity: 3000cPo+/−1500cPo (Brookfield RV/Spindle #4/20 RPM)).

Example 33

Shower-Gel Composition

A sufficient amount of microcapsule slurry G, H, I, J, K or L is weighed and mixed in the following composition (Table 32) to add the equivalent of 0.2% perfume.

TABLE 32 shower gel composition

| Ingredients | Amount (% wt) | Function |
|---|---|---|
| WATER deionized | 50.950 | Solvent |
| Tetrasodium EDTA [1] | 0.050 | Chelating agent |
| Sodium Benzoate | 0.500 | Preservative |
| Glycerin 86% | 3.500 | Solvent |
| Sodium Laureth Sulfate [2] | 27.000 | Surfactant |
| Polyquaternium-7[3] | 1.000 | Conditioning Agent |
| Coco-Betaine[4] | 6.000 | Surfactant |
| PEG-120 Methyl Glucose trioleate[5] | 1.000 | Thickener |
| Citric Acid (40%) | 1.000 | pH adjuster |
| Glycol Distearate & Laureth-4 & Cocamidopropyl Betaine[6] | 3.000 | Pearlizing agent |
| Sodium Chloride 20% | 5.000 | Viscosity adjuster |
| PEG-40 Hydrogenated Castor Oil[7] | 1.000 | Viscosity adjuster |

[1] EDETA B POWDER; trademark and origin: BASF
[2] Texapon NSO IS; trademark and origin: COGNIS
[3] MERQUAT 550; trademark and origin: LUBRIZOL
[4] DEHYTON AB-30; trademark and origin: COGNIS
[5] GLUCAMATE LT; trademark and origin: LUBRIZOL
[6] EUPERLAN PK 3000 AM; trademark and origin: COGNIS
[7] CREMOPHOR RH 40; trademark and origin: BASF Ingredients are mixed, pH is adjusted to 4.5 (Viscosity: 4000cPo+/−1500cPo (Brookfield RV/Spindle #4/20 RPM))

Example 34

Hand Dishwash

A sufficient amount of microcapsule slurry G, H, I, J, K or L is weighed and mixed in the following composition (Table 33) to add the equivalent of 0.2% perfume.

TABLE 33

Hand dishwash composition

| Ingredients | Amount (% wt) | Function |
|---|---|---|
| Linear alkylbenzene sulfonic acid [1] | 20 | Anionic surfactant |
| Diethanolamide [2] | 3.5 | Foam booster |

TABLE 33-continued

Hand dishwash composition

| Ingredients | Amount (% wt) | Function |
|---|---|---|
| Sodium Hydroxide (50%) [3] | 3.4 | pH Adjuster/neutralizer |
| Secondary alcohol ethoxolate [4] | 2.5 | Non-ionic surfactant |
| Sodium xylene sulfonate | 6.3 | Hydrotrope |
| Water | 64.3 | Solvent |

[1] Biosoft S-118 ®; trademark and origin: Stepan Company
[2] Ninol 40-CO ®; trademark and origin: Stepan Company
[3] Stepanate SXS ®; trademark and origin: Stepan Company
[4] Tergitol 15-S-9 ®; trademark and origin: Dow Chemical Company Water with sodium hydroxide and diethanolamide are mixed. LAS is added. After the LAS is neutralized, the remaining ingredients are added. The pH was Checked (=7-8) and adjusted if necessary.

Example 35

Toothpaste Formulation

A sufficient amount of microcapsule slurry M (corresponding to microcapsules A except that a menthol flavor is encapsulated) is weighed and mixed in the following composition (Table 34) to add the equivalent of 0.2% flavor.

TABLE 34

Toothpaste formulation

| Ingredients | Amount (% wt) |
|---|---|
| Polyethylene glycol 400 | 2.0% |
| Xanthan Gum | 0.6% |
| Sorbitol 70% Solution | 50% |
| Sodium Fluoride | 0.220% |
| Sodium Benzoate | 0.2% |
| Water | 15.230% |
| Hydrated Silica[1] | 22.0% |
| Hydrated Silica[2] | 7.0% |
| Titanium Dioxide CI77891 | 0.5% |
| Sodium Lauryl Sulfate | 1.250% |
| Flavor | 1.2% |
| TOTAL | 100% |

[1] Tixosil 73; trademark and origin:
[2] Tixosil 43; trademark and origin:

Example 36

Dicalcium Phosphate Based Toothpaste Formulation

A sufficient amount of microcapsule slurry M (corresponding to microcapsules A except that a menthol flavor is encapsulated) is weighed and mixed in the following composition (Table 35) to add the equivalent of 0.2% flavor.

TABLE 35

Toothpaste formulation

| Ingredients | Amount (% wt) |
|---|---|
| Sodium carboxymethyl cellulose | 1.2% |
| Flavor | 1.2% |
| DI/Purified Water | Q.S to Final Wt. |
| Sodium Lauryl Sulfate | 1.3% |
| Glycerine | 20.0% |
| Sodium Saccharin | 0.2% |

TABLE 35-continued

Toothpaste formulation

| Ingredients | Amount (% wt) |
| --- | --- |
| Dicalcium phosphate dihydrate | 36.0% |
| Methylparaben | 0.2% |
| Silica[1] | 3.0% |
| TOTAL | 100% |

[1] Aerosil ®200; trademark and origin:

Example 37

Mouthwash Alcohol Free Formulation

A sufficient amount of microcapsule slurry M (corresponding to microcapsules A except that a menthol flavor is encapsulated) is weighed and mixed in the following composition (Table 36) to add the equivalent of 0.2% flavor.

TABLE 36

Mouthwash formulation

| Ingredients | Amount (% wt) |
| --- | --- |
| Propylene Glycol | 10% |
| Flavor | 0.240% |
| DI/Purified Water | Q.S to Final Wt. |
| Poloxamer 407 NF | 0.240% |
| Sodium Lauryl Sulfate | 0.040% |
| Sorbitol 70% Solution | 10.0% |
| Sodium Saccharin | 0.030% |
| Glycerine | 3.0% |
| Sodium Benzoate | 0.100% |
| Sucralose | 0.020% |
| Benzoic Acid | 0.050% |
| TOTAL | 100% |

Example 38

Mouthwash Formulation

A sufficient amount of microcapsule slurry M (corresponding to microcapsules A except that a menthol flavor is encapsulated) is weighed and mixed in the following composition (Table 37) to add the equivalent of 0.2% flavor.

TABLE 37

Mouthwash formulation

| Ingredients | Amount (% wt) |
| --- | --- |
| Ethyl Alcohol 190 Proof | 15.0% |
| Flavor | 0.240% |
| DI/Purified Water | Q.S to Final Wt. |
| Poloxamer 407 NF | 0.240% |
| Sodium Lauryl Sulfate | 0.040% |
| Sorbitol 70% Solution | 10.0% |
| Sodium Saccharin | 0.030% |
| Glycerine | 3.0% |
| Sodium Benzoate | 0.100% |
| Sucralose | 0.020% |
| Benzoic Acid | 0.050% |
| TOTAL | 100% |

The invention claimed is:

1. A process for preparing a core-shell microcapsule slurry, said process comprising the steps of:
    a) dispersing an oil phase comprising a hydrophobic material into an aqueous phase comprising a globular protein to form an oil-in-water emulsion;
    b) adding an aqueous solution comprising a polysaccharide into the oil-in-water emulsion to form a protein/polysaccharide complex in which at least one part of the polysaccharide is adsorbed onto the protein; and
    c) applying a sufficient condition to induce the denaturation of the protein and induce an aggregation of the protein/polysaccharides complex to form core-shell microcapsules in the form of a slurry;
    wherein a mean oil droplet size in the oil-in-water emulsion is between 15 and 500 microns;
    wherein a crosslinker is optionally added in the mixture obtained in step b) and/or in the mixture obtained in step c);
    wherein the process results in core-shell microcapsules with only one shell; and
    wherein the shell of the core-shell microcapsules consists of the protein/polysaccharides complex and optionally a crosslinker.

2. The process according to claim 1, wherein the globular protein is selected from the group consisting of whey protein, beta-lactoglobulin, ovalbumine, bovine serum albumin, vegetable protein, and mixtures thereof.

3. The process according to claim 1, wherein the polysaccharide is selected from the group consisting of pectin, carrageenans, alginate, and mixtures thereof.

4. The process according to claim 1, wherein the protein is whey protein and the polysaccharide is pectin.

5. The process according to claim 1, wherein the denaturation of the protein in step c) is induced by a heating step.

6. The process according to claim 5, wherein the heating step is carried out at a temperature $T_{den}$ comprised between 5° and 100° C.

7. The process according to claim 1, wherein the weight ratio between the oil phase and the protein is comprised between 1 and 10.

8. The process according to claim 1, wherein the weight ratio between the protein and the polysaccharide is comprised between 1 and 10.

9. The process according to claim 1, wherein a calcium solution is further added in the emulsion obtained in step a) and/or in the mixture obtained in step b).

10. The process according to claim 1, wherein the crosslinker is added in the mixture obtained in step b) and/or in the mixture obtained in step c).

11. A microcapsule slurry comprising at least one microcapsule made of:
    an oil-based core comprising a hydrophobic material, and
    a single shell consisting of a protein/polysaccharides complex and optionally a crosslinker.

12. A composition comprising microcapsules according to claim 11, wherein the composition is in the form of a perfumed product.

13. The process according to claim 1, wherein the hydrophobic material is a flavor or a perfume.

14. The process according to claim 1, wherein the polysaccharide is high methoxy pectin.

15. The process according to claim 5, wherein the heating step is carried out at a temperature $T_{den}$ comprised between 8° and 100° C.

16. The process according to claim 10, wherein the crosslinker is selected from the group consisting of transglutaminase, glutaraldehyde, genipin, and mixtures thereof.

17. A composition comprising microcapsules as defined in claim 11, wherein the composition is in the form of a perfumed product selected from the group consisting of body care products and laundry care products, or in the form of a flavored product selected from the group consisting of snacks, dairy products, bakery products, and confectionary.

18. The process according to claim 1, wherein the process consists of the steps of:
 a) dispersing an oil phase comprising a hydrophobic material into an aqueous phase comprising a globular protein to form an oil-in-water emulsion;
 b) adding an aqueous solution comprising a polysaccharide into the oil-in-water emulsion to form a protein/polysaccharide complex in which at least one part of the polysaccharide is adsorbed onto the protein;
 c) applying a sufficient condition to induce the denaturation of the protein and induce an aggregation of the protein/polysaccharides complex to form core-shell microcapsules in the form of a slurry; and
 d) optionally drying the slurry obtained in step c).

* * * * *